United States Patent
Yu

(10) Patent No.: US 11,644,645 B2
(45) Date of Patent: May 9, 2023

(54) CAMERA OPTICAL LENS

(71) Applicant: AAC Optics (Changzhou) Co., Ltd., Changzhou (CN)

(72) Inventor: Dong Yu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 242 days.

(21) Appl. No.: 17/134,204

(22) Filed: Dec. 25, 2020

(65) Prior Publication Data
US 2022/0026675 A1    Jan. 27, 2022

(30) Foreign Application Priority Data
Jul. 22, 2020    (CN) .......................... 202010707999.9

(51) Int. Cl.
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC .................................. G02B 13/004; G02B 9/34
See application file for complete search history.

(56) References Cited

U.S. PATENT DOCUMENTS

2016/0062077 A1* 3/2016 Fang .................... G02B 9/34
359/738

\* cited by examiner

*Primary Examiner* — Joseph P Martinez
(74) *Attorney, Agent, or Firm* — W&G Law Group

(57) ABSTRACT

A camera optical lens includes first to fourth lenses from an object side to an image side, with first and fourth lenses having negative refractive power, and a third lens having positive refractive power, and satisfies $-3.50 \leq f1/f \leq -2.00$; $0.55 \leq f3/f \leq 0.75$; $5.00 \leq d3/d4 \leq 15.00$; $5.00 \leq d5/d6 \leq 35.00$; $-20.00 \leq (R3+R4)/(R3-R4) \leq -3.00$; and $-5.00 \leq R1/R2 \leq -2.00$, where f, f1, and f3 respectively denote focal lengths of the camera optical lens, the first lens, and the third lens, d3 and d5 respectively denote on-axis thicknesses of second and third lenses, d4 and d6 respectively denote a distance between second and third lenses and a distance between third and fourth lenses, R3 and R4 respectively denote curvature radii of object side and image side surfaces of the second lens, and R1 and R2 denotes curvature radii of object side and image side surfaces of the first lens, thereby having good optical performance while meeting design requirements of a wide angle and ultra-thinness.

10 Claims, 15 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, a pixel size of the photosensitive device has been reduced, and nowadays electronic products are developing with good functions, and thin and short appearance, therefore, the miniaturized camera lens with good imaging quality has become the mainstream in the current market.

In order to obtain a better imaging quality, the camera lens traditionally mounted onto a mobile phone camera mostly adopts a structure including three lenses. However, with the development of technology and increased diversified requirements from the users, in the situation that a pixel area of a photosensitive device gradually decreases and the requirement in the imaging quality gradually increases, camera lens having a four-lens structure has gradually appeared in lens design. Although the conventional camera lens including four lenses already has good optical performance, there is still some irrationality in terms of focal length, a distance between lenses and shapes of the respective lenses. As a result, the lens structure cannot meet the design requirements of a wide angle and ultra-thinness while having good optical performance.

SUMMARY

In view of the above-mentioned problems, a purpose of the present invention is to provide a camera optical lens, which not only has good optical performance, but also meets the design requirements of a wide angle and ultra-thinness.

In order to solve the above-mentioned technical problems, an embodiment of the present invention provides a camera optical lens, including, from an object side to an image side, a first lens having a negative refractive power, a second lens, a third lens having a positive refractive power, and a fourth lens having a negative refractive power. The camera optical lens satisfies: $-3.50 \leq f1/f \leq -2.00$; $0.55 \leq f3/f \leq 0.75$; $5.00 \leq d3/d4 \leq 15.00$; $5.00 \leq d5/d6 \leq 35.00$; $-20.00 \leq (R3+R4)/(R3-R4) \leq -3.00$; and $-5.00 \leq R1/R2 \leq -2.00$, where f denotes a focal length of the camera optical lens, f1 denotes a focal length of the first lens, f3 denotes a focal length of the third lens, d3 denotes an on-axis thickness of the second lens, d4 denotes an on-axis distance from an image side surface of the second lens to an object side surface of the third lens, d5 denotes an on-axis thickness of the third lens, d6 denotes an on-axis distance from an image side surface of the third lens to an object side surface of the fourth lens, R3 denotes a curvature radius of an object side surface of the second lens, R4 denotes a curvature radius of the image side surface of the second lens, R1 denotes a curvature radius of an object side surface of the first lens, and R2 denotes a curvature radius of an image side surface of the first lens.

In an improved embodiment, the camera optical lens further satisfies a following condition: $2.00 \leq R7/R8 \leq 8.00$, where R7 denotes a curvature radius of the object side surface of the fourth lens, and R8 denotes a curvature radius of an image side surface of the fourth lens.

In an improved embodiment, the camera optical lens further satisfies following conditions: $0.17 \leq (R1+R2)/(R1-R2) \leq 1.00$; and $0.04 \leq d1/TTL \leq 0.17$, where d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $-344.59 \leq f2/f \leq 249.79$; and $0.06 \leq d3/TTL \leq 0.38$, where f2 denotes a focal length of the second lens, and TTL denotes a total optical length from the object side surface of the first lens to an image plane of the camera optical lens along an optic axis.

In an improved embodiment, the camera optical lens further satisfies following conditions: $-0.20 \leq (R5+R6)/(R5-R6) \leq 0.65$; and $0.11 \leq d5/TTL \leq 0.39$, where R5 denotes a curvature radius of the object side surface of the third lens, R6 denotes a curvature radius of the image side surface of the third lens, and TTL denotes a total optical length from the object side surface of the first lens to an image plane of the camera optical lens along an optic axis.

In an improved embodiment, the camera optical lens further satisfies following conditions: $-2.68 \leq f4/f \leq -0.41$; $0.64 \leq (R7+R8)/(R7-R8) \leq 4.42$; and $0.03 \leq d7/TTL \leq 0.13$, where f4 denotes a focal length of the fourth lens, R7 denotes a curvature radius of the object side surface of the fourth lens, R8 denotes a curvature radius of an image side surface of the fourth lens, d7 denotes an on-axis thickness of the fourth lens, and TTL denotes a total optical length from the object side surface of the first lens to an image plane of the camera optical lens along an optic axis.

In an improved embodiment, the camera optical lens further satisfies a following condition: $FOV \geq 114.00°$, where FOV denotes a field of view of the camera optical lens.

In an improved embodiment, the camera optical lens further satisfies a following condition: $-6.94 \leq f12/f \leq -1.70$, where f12 denotes a combined focal length of the first lens and the second lens.

In an improved embodiment, the camera optical lens further satisfies a following condition: $FNO \leq 2.27$, where FNO denotes an F number of the camera optical lens.

In an improved embodiment, the camera optical lens further satisfies a following condition: $TTL/IH \leq 3.33$, where IH denotes an image height of the camera optical lens, and TTL denotes a total optical length from the object side surface of the first lens to an image plane of the camera optical lens along an optic axis.

The present invention has at least the following beneficial effects. The camera optical lens according to the present invention has good optical performance and has the characteristics of a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
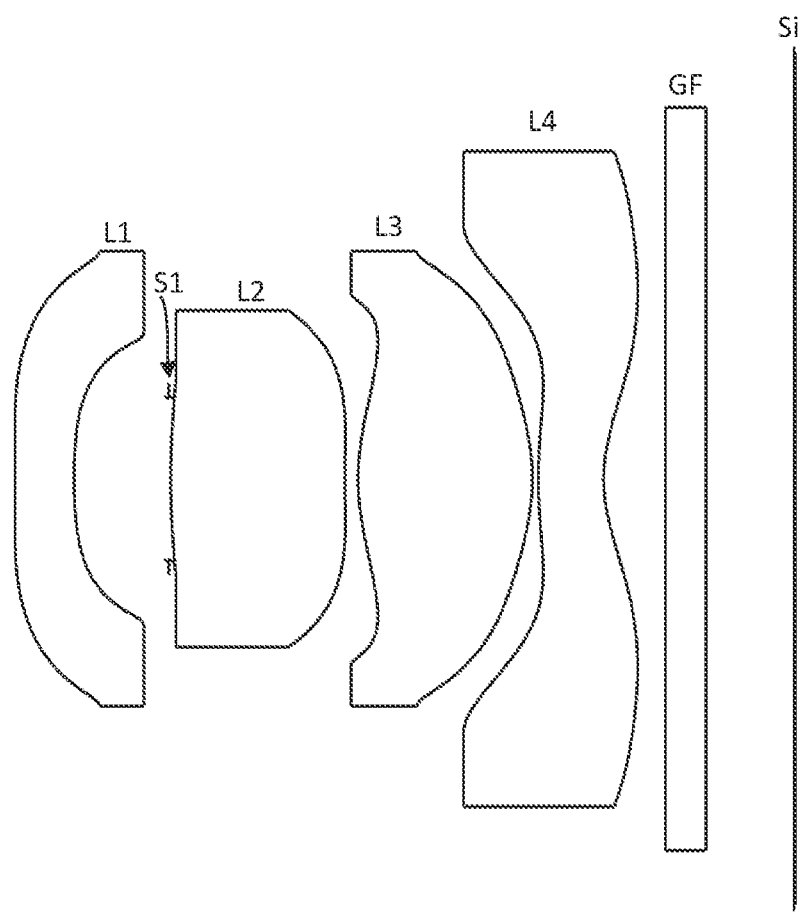
FIG. 1 is a schematic structural diagram of a camera optical lens according to Embodiment 1.

With reference to the accompanying drawings, the present invention provides a camera optical lens 10. FIG. 1 illustrates a camera optical lens 10 according to Embodiment 1 of the present invention. The camera optical lens 10 includes four lenses. Specifically, the camera optical lens 10 includes, from an object side to an image side, a first lens L1, an aperture S1, a second lens L2, a third lens L3, and a fourth lens L4. In this embodiment, As an example, an optical element such as a glass plate GF is provided between the fourth lens L4 and an image plane Si. The glass plate GF may be a glass cover plate or an optical filter. Of course, in other embodiments, the glass plate GF may also be arranged in another position.

In this embodiment, the first lens L1 has a negative refractive power, the second lens L2 has a positive refractive power, the third lens L3 has a positive refractive power, and the fourth lens L4 has a negative refractive power.

In this embodiment, the first lens L1 is made of a plastic material, the second lens L2 is made of a plastic material, the third lens L3 is made of a plastic material, and the fourth lens L4 is made of a plastic material. In other embodiments, the lenses may be made of other materials.

Herein, it is defined that a focal length of the camera optical lens 10 is denoted by f, a focal length of the first lens L1 is denoted by f1, a focal length of the third lens L3 is denoted by f3, a curvature radius of an object side surface of the first lens L1 is denoted by R1, a curvature radius of an image side surface of the first lens L1 is denoted by R2, a curvature radius of an object side surface of the second lens L2 is denoted by R3, a curvature radius of an image side surface of the second lens L2 is denoted by R4, an on-axis thickness of the second lens L2 is denoted by d3, an on-axis distance from the image side surface of the second lens L2 to an object side surface of the third lens L3 is denoted by d4, an on-axis thickness of the third lens L3 is denoted by d5, an on-axis denoted by distance from an image side surface of the third lens L3 to an object side surface of the fourth lens L4 is denoted by d6, and the camera optical lens satisfies the following conditions:

$$-3.50 \leq f1/f \leq -2.00 \quad (1)$$

$$0.55 \leq f3/f \leq 0.75 \quad (2)$$

$$5.00 \leq d3/d4 \leq 15.00 \quad (3)$$

$$5.00 \leq d5/d6 \leq 35.00 \quad (4)$$

$$-20.00 \leq (R3+R4)/(R3-R4) \leq -3.00 \quad (5)$$

$$-5.00 \leq R1/R2 \leq -2.00 \quad (6)$$

The condition (1) specifies a ratio of the focal length f1 of the first lens L1 to the focal length f of the camera optical lens 10. Within a range defined by this condition, it can effectively balance spherical aberration and field curvature of the camera optical lens 10.

The condition (2) specifies a ratio of the focal length f3 of the third lens L3 to the total focal length f of the camera optical lens 10, and reasonable allocation of refractive power enables the camera optical lens 10 to have better imaging quality and lower sensitivity.

The condition (3) specifies a ratio of the on-axis thickness d3 of the second lens L2 to an air gap d4 between the second and third lenses. Within a range defined by this condition, it is beneficial to reduce the total length of the optical system and achieve ultra-thinning.

The condition (4) specifies to ratio of the on-axis thickness d5 of the third lens L3 to an air gap d6 between the third and fourth lenses. Within a range defined by this condition, it is beneficial to reduce the total length of the optical system and achieve ultra-thinness.

The condition (5) specifies a shape of the second lens L2. Within a range defined by this condition, it is beneficial to alleviate a degree of deflection of light passing through the lens and effectively reduce aberration.

The condition (6) specifies a shape of the first lens L1. Within a range defined by this condition, it is beneficial to alleviate a degree of deflection of light passing through the lens and effectively reduce aberration.

It is defined that a curvature radius of the object side surface of the fourth lens L4 is denoted by R7, a curvature radius of an image side surface of the fourth lens L4 is denoted by R8, and the camera optical lens satisfies the following condition: $2.00 \leq R7/R8 \leq 8.00$, which specifies a shape of the fourth lens L4. Within a range defined by this condition, with the development of ultra-thinness and wide angle, it is beneficial to correct off-axis aberration.

In this embodiment, the object side surface of the first lens L1 is a concave surface at a paraxial position, and the image side surface of the first lens L1 is a concave surface at a paraxial position.

A curvature radius of the object side surface of the first lens L1 is denoted by R1, a curvature radius of the image side surface of the first lens L1 is denoted by R2, and the camera optical lens further satisfies the following condition: $0.17 \leq (R1+R2)/(R1-R2) \leq 1.00$. By reasonably controlling a shape of the first lens L1, the first lens L1 can effectively correct spherical aberration of the system. As an example, the camera optical lens further satisfies the following condition: $0.27 \leq (R1+R2)/(R1-R2) \leq 0.80$.

It is defined that an on-axis thickness of the first lens L1 is denoted by d1, a total optical length from the object side surface of the first lens to the image plane of the camera optical lens 10 along an optic axis is denoted by TTL, and the camera optical lens further satisfies the following condition: $0.04 \leq d1/TTL \leq 0.17$. Within a range defined by this condition, it is beneficial to achieve ultra-thinness. As an example, the camera optical lens further satisfies the following condition: $0.06 \leq d1/TTL \leq 0.14$.

In this embodiment, the object side surface of the second lens L2 is a convex surface at a paraxial position, and the image side surface of the second lens L2 is a concave surface at a paraxial position.

The focal length of the camera optical lens 10 is denoted by f, it is defined that a focal length of the second lens L2 is denoted by f2, and the camera optical lens further satisfies the following condition: $-344.59 \leq f2/f \leq 249.79$. By controlling refractive power of the second lens L2 within a reasonable range, it is beneficial to correct aberration of the optical system. As an example, the camera optical lens further satisfies the following condition:

$$-215.37 \leq f2/f \leq 199.84.$$

The total optical length from the object side surface of the first lens to the image plane of the camera optical lens 10 along the optic axis is denoted by TTL, and an on-axis thickness of the second lens L2 is denoted by d3, and the camera optical lens further satisfies the following condition: $0.06 \leq d3/TTL \leq 0.38$. Within a range defined by this condition, it is beneficial to achieve ultra-thinness. As an example, the camera optical lens further satisfies the following condition: $0.10 \leq d3/TTL \leq 0.31$.

In this embodiment, the object side surface of the third lens L3 is a convex surface at a paraxial position, and the image side surface of the third lens L3 is a convex surface at a paraxial position.

It is defined that a curvature radius of the object side surface of the third lens L3 is denoted by R5, a curvature radius of the image side surface of the third lens L3 is denoted by R6, and the camera optical lens further satisfies the following condition: $-0.20 \leq (R5+R6)/(R5-R6) \leq 0.65$, which specifies a shape of the third lens L3. Within a range defined by this condition, it is beneficial to forming of the third lens L3, and it is beneficial to alleviate a degree of deflection of light passing through the lens and effectively reduce aberration. As an example, the camera optical lens further satisfies the following condition:

$$-0.12 \leq (R5+R6)/(R5-R6) \leq 0.52.$$

An on-axis thickness of the third lens L3 is denoted by d5, the total optical length from the object side surface of the first lens to the image plane of the camera optical lens 10 along the optic axis is denoted by TTL, and the camera optical lens further satisfies the following condition: $0.11 \leq d5/TTL \leq 0.39$. Within a range defined by this condition, it is beneficial to achieve ultra-thinness. As an example, the camera optical lens further satisfies the following condition: $0.17 \leq d5/TTL \leq 0.31$.

In this embodiment, the object side surface of the fourth lens L4 is a convex surface at a paraxial position, and the image side surface of the fourth lens L4 is a concave surface at a paraxial position.

The focal length of the camera optical lens 10 is denoted by f, it is defined that a focal length of the fourth lens L4 is denoted by f4, and the camera optical lens further satisfies the following condition: $-2.68 \leq f4/f \leq -0.41$. Reasonable allocation of refractive power enables the system to have better imaging quality and lower sensitivity. As an example, the camera optical lens further satisfies the following condition: $-1.67 \leq f4/f \leq -0.52$.

It is defined that a curvature radius of the object side surface of the fourth lens L4 is denoted by R7, a curvature radius of the image side surface of the fourth lens L4 is denoted by R8, and the camera optical lens further satisfies the following condition:

$0.64 \leq (R7+R8)/(R7-R8) \leq 4.42$, which specifies a shape of the fourth lens L4. Within a range defined by this condition, with the development of ultra-thinness and wide angle, it is beneficial to correct off-axis aberration. As an example, the camera optical lens further satisfies the following condition: $1.03 \leq (R7+R8)/(R7-R8) \leq 3.53$.

The total optical length from the object side surface of the first lens to the image plane of the camera optical lens 10 along the optic axis is denoted by TTL, it is defined that an on-axis thickness of the fourth lens L4 is denoted by d7, and the camera optical lens further satisfies the following condition: $0.03 \leq d7/TTL \leq 0.13$. Within a range defined by this condition, it is beneficial to achieve ultra-thinness. As an example, the camera optical lens further satisfies the following condition: $0.05 \leq d7/TTL \leq 0.10$.

In this embodiment, the field of view of the camera optical lens 10 is denoted by FOV, and the camera optical lens further satisfies the following condition: $FOV \geq 114.00°$, so as to achieve a wide angle.

In this embodiment, the focal length of the camera optical lens 10 is denoted by f, a combined focal length of the first lens L1 and the second lens L2 is denoted by f12, and the camera optical lens further satisfies the following condition: $-6.94 \leq f12/f \leq -1.70$. Within a range defined by this condition, aberration and distortion of the camera optical lens 10 can be eliminated, and a back focal length of the camera optical lens 10 can be reduced to maintain miniaturization of the image lens system group. As an example, the camera optical lens further satisfies the following condition: $-4.34 \leq f12/f \leq -2.13$.

In this embodiment, an F number of the camera optical lens 10 is denoted by FNO, and the camera optical lens further satisfies the following condition: $FNO \leq 2.27$, so as to achieve a large aperture. As an example, the camera optical lens further satisfies the following condition: FNO≤2.22.

In this embodiment, the total optical length from the object side surface of the first lens to the image plane of the camera optical lens 10 along the optic axis is denoted by TTL, an image height of the camera optical lens is IH, and the camera optical lens further satisfies the following condition: TTL/IH≤3.33, so as to achieve ultra-thinness. As an example, the camera optical lens further satisfies the following condition: TTL/IH≤2.66.

When the above-mentioned conditions are satisfied, the camera optical lens 10 can meet the design requirements of a wide angle and ultra-thinness while having good optical performance. According to the characteristics of the camera optical lens 10, the camera optical lens 10 is especially suitable for the mobile phone camera lens assembly and the WEB camera lens composed of imaging elements such as CCD and CMOS for high pixels.

The following description will illustrate the camera optical lens 10 of the present invention with examples. The symbols described in each example are as follows. The focal length, the on-axis distance, the curvature radius, the on-axis thickness, the inflection point position, and stagnation point position are all expressed in unit of mm.

TTL: a total optical length (an on-axis distance from an object side surface of the first lens L1 to an image surface Si along an optic axis), in unit of mm.

FNO: an F number (a ratio of an effective focal length of the camera optical lens to an entrance pupil diameter).

In addition, at least one of the object side surface and the image side surface of each lens may also be provided with an inflection point and/or a stagnation point to meet high-quality imaging requirements. For specific implementation manners, please refer to the following description.

FIG. 1 shows design data of the camera optical lens 10.

For the first lens L1 to the fourth lens L4 constituting the camera optical lens 10 according to Embodiment 1 of the present invention, the curvature radius R of the object side surface and the curvature radius R of the image side surface of each lens, the on-axis thickness of each lens, the distance d between two adjacent lenses, the refractive index nd and the abbe number vd are listed in Table 1. It should be noted that in this embodiment, R and d are expressed in unit of millimeter (mm).

TABLE 1

|     | R      | d          | nd        | vd       |
|-----|--------|------------|-----------|----------|
| S1  | ∞      | d0= -0.793 |           |          |
| R1  | -7.178 | d1= 0.304  | nd1 1.5346 | v1 55.69 |
| R2  | 2.432  | d2= 0.498  |           |          |
| R3  | 3.243  | d3= 0.898  | nd2 1.5346 | v2 55.69 |
| R4  | 3.803  | d4= 0.069  |           |          |
| R5  | 0.902  | d5= 0.899  | nd3 1.5346 | v3 55.69 |
| R6  | -0.776 | d6= 0.030  |           |          |
| R7  | 2.035  | d7= 0.336  | nd4 1.6700 | v4 19.39 |
| R8  | 0.600  | d8= 0.318  |           |          |
| R9  | ∞      | d9= 0.210  | ndg 1.5168 | vg 64.17 |
| R10 | ∞      | d10= 0.459 |           |          |

The symbols in the above table are defined as follows.
R: curvature radius at a center of an optical surface
S1: aperture;
R1: curvature radius of an object side surface of a first lens L1;
R2: curvature radius of an image side surface of the first lens L1;
R3: curvature radius of an object side surface of a second lens L2;
R4: curvature radius of an image side surface of the second lens L2;
R5: curvature radius of an object side surface of a third lens L3;
R6: curvature radius of an image side surface of the third lens L3;
R7: curvature radius of an object side surface of a fourth lens L4;
R8: curvature radius of an image side surface of the fourth lens L4;
R9: curvature radius of an object side surface of an optical filter GF;
R10: curvature radius of an image side surface of the optical filter GF;
d: on-axis thickness of a lens, on-axis distance between adjacent lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the glass plate GF;
d9: on-axis thickness of the glass plate GF;
d10: on-axis distance from the image side surface of the glass plate GF to the image plane Si;
nd: refractive index of d-line (d-line is green light having a wavelength of 550 nm);
nd1: refractive index of d-line of the first lens L1;
nd2: refractive index of d-line of the second lens L2;
nd3: refractive index of d-line of the third lens L3;
nd4: refractive index of d-line of the fourth lens L4;
ndg: refractive index of d-line of the glass plate GF;
vd: abbe number;
v1: abbe number of the first lens L1;
v2: abbe number of the second lens L2;
v3: abbe number of the third lens L3;
v4: abbe number of the fourth lens L4;
vg: abbe number of the glass plate GF.

Table 2 shows aspherical surface data of the lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | −7.4673E+01 | 8.1623E−01 | −1.1771E+00 | −1.9339E−01 | 1.1783E+01 | −4.3232E+01 |
| R2 | 1.1378E+01 | 1.3775E+00 | −3.9706E+00 | 2.2027E+01 | 1.3342E+01 | −1.3039E+03 |
| R3 | 4.5576E+01 | −1.2847E−01 | −6.0840E+00 | 1.2704E+02 | −1.5653E+03 | 7.2957E+03 |
| R4 | −9.9890E+01 | −1.7148E+00 | 4.3628E+00 | −7.6608E+00 | −3.9190E+01 | 3.2232E+02 |
| R5 | −6.4493E+00 | −5.2258E−01 | 2.9377E+00 | −1.6561E+01 | 5.8898E+01 | −1.3491E+02 |
| R6 | −1.4764E+00 | 1.5239E+00 | −6.8957E+00 | 2.3827E+01 | −6.5769E+01 | 1.3008E+02 |
| R7 | −2.4078E+00 | −3.6905E−01 | −1.9276E+00 | 4.9025E+00 | −8.9810E+00 | 1.4840E+01 |
| R8 | −4.6973E+00 | −2.8394E−01 | −4.2564E−01 | 1.6720E+00 | −2.5890E+00 | 2.4468E+00 |

| | Cone coefficient | Aspherical coefficient | | | |
|---|---|---|---|---|---|
| | k | A14 | A16 | A18 | A20 |
| R1 | −7.4673E+01 | 8.2895E+01 | −9.1095E+01 | 5.4167E+01 | −1.3507E+01 |
| R2 | 1.1378E+01 | 1.0010E+04 | −3.5793E+04 | 6.3759E+04 | −4.5518E+04 |
| R3 | 4.5576E+01 | 3.0554E+04 | −5.2962E+05 | 2.3352E+06 | −3.5568E+06 |
| R4 | −9.9890E+01 | −1.0645E+03 | 1.9237E+03 | −1.8591E+03 | 7.5282E+02 |
| R5 | −6.4493E+00 | 1.6253E+02 | −3.6228E+01 | −1.2614E+02 | 9.6534E+01 |
| R6 | −1.4764E+00 | −1.7550E+02 | 1.5237E+02 | −7.6496E+01 | 1.6843E+01 |
| R7 | −2.4078E+00 | −1.7728E+01 | 1.3358E+01 | −5.6437E+00 | 1.0173E+00 |
| R8 | −4.6973E+00 | −1.4869E+00 | 5.6459E−01 | −1.2165E−01 | 1.1333E−02 |

Herein, k represents a cone coefficient, and A4, A6, A8, A10, A12, A14, A16, A18, and A20 represent aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (7)$$

In the equation (7), x represents a vertical distance between a point on an aspherical curve and an optic axis, and y represents an aspherical depth (a vertical distance between a point on the aspherical surface that is distanced from the optic axis by x and a surface tangent to a vertex of the aspherical surface on the optic axis).

It should be noted that the aspheric surface of each lens in this embodiment As an example adopts the aspheric surface defined by the above-mentioned equation (7). However, it should be noted that the specific form defined by the above-mentioned equation (7) is only an example, and in fact, it is not limited to the aspherical polynomial form shown in the equation (7).

Table 3 and Table 4 show the design data of the inflection point and the stagnation point of each lens in the camera optical lens 10 according to this embodiment. Herein, P1R1 and P1R2 respectively represent the object side surface and image side surface of the first lens L1; P2R1 and P2R2 respectively represent the object side surface and image side surface of the second lens L2; P3R1 and P3R2 respectively represent the object side surface and the image side surface of the third lens L3; and P4R1 and P4R2 respectively represent the object side surface and image side surface of the fourth lens L4. The corresponding data in the "inflection point position" column is a vertical distance from the inflection point set on a surface of each lens to the optic axis of the camera optical lens 10. The corresponding data in the "stagnation point position" column is a vertical distance from the stagnation point set on a surface of each lens to the optic axis of the camera optical lens 10.

TABLE 3

| | Number of inflection points | Inflection point position 1 | Inflection point position 2 |
|---|---|---|---|
| P1R1 | 2 | 0.125 | 0.985 |
| P1R2 | 1 | 0.625 | / |
| P2R1 | 0 | / | / |
| P2R2 | 1 | 0.115 | / |
| P3R1 | 2 | 0.375 | 0.825 |
| P3R2 | 1 | 0.975 | / |
| P4R1 | 2 | 0.265 | 0.905 |
| P4R2 | 2 | 0.355 | 1.455 |

TABLE 4

| | Number of stagnation points | Stagnation point position 1 |
|---|---|---|
| P1R1 | 1 | 0.215 |
| P1R2 | 0 | / |
| P2R1 | 0 | / |
| P2R2 | 1 | 0.195 |
| P3R1 | 1 | 0.625 |
| P3R2 | 0 | / |
| P4R1 | 1 | 0.425 |
| P4R2 | 1 | 0.855 |

Figure 2:
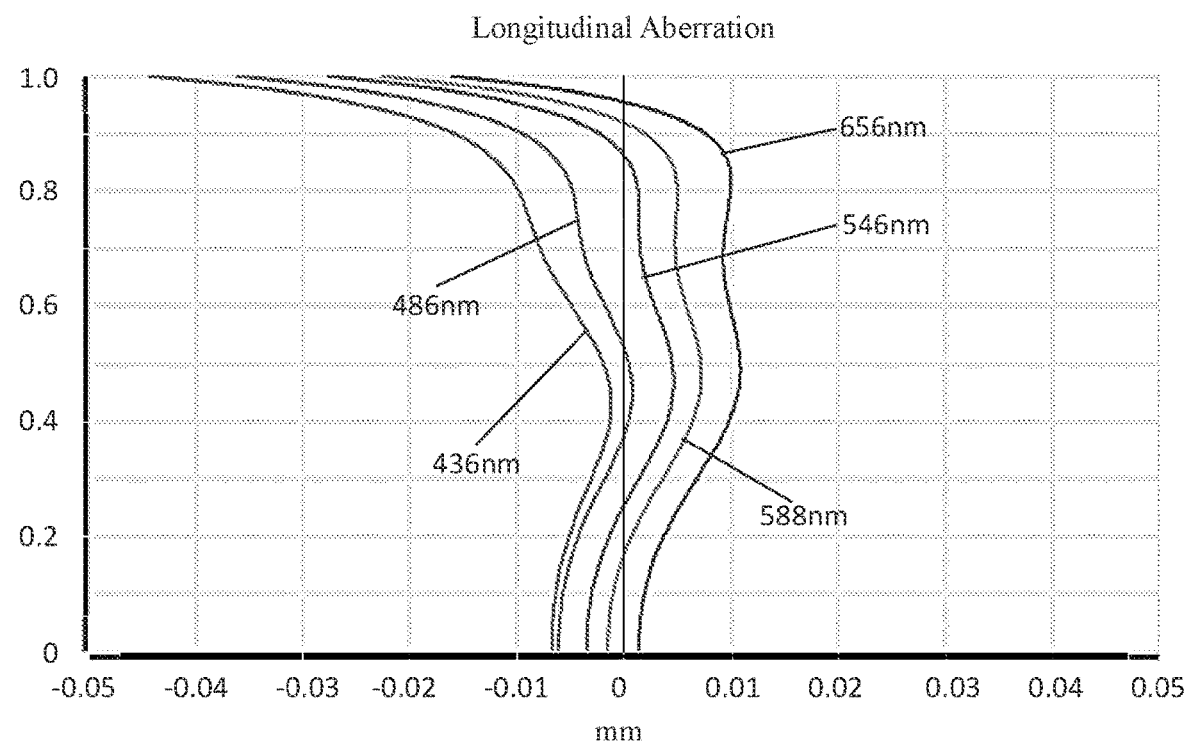
FIG. 2 is a schematic diagram of longitudinal aberration of the camera optical lens shown in FIG. 1.
Figure 3:
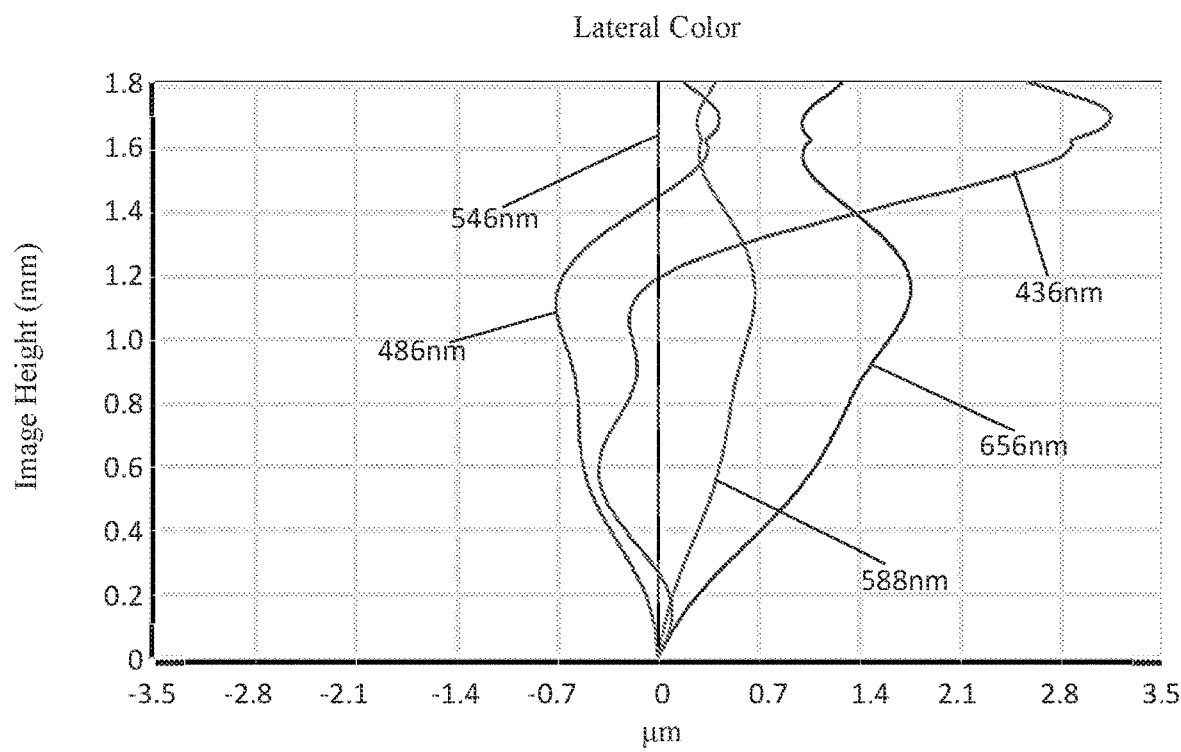
FIG. 3 is a schematic diagram of lateral color of the camera optical lens shown in FIG. 1.
Figure 4:
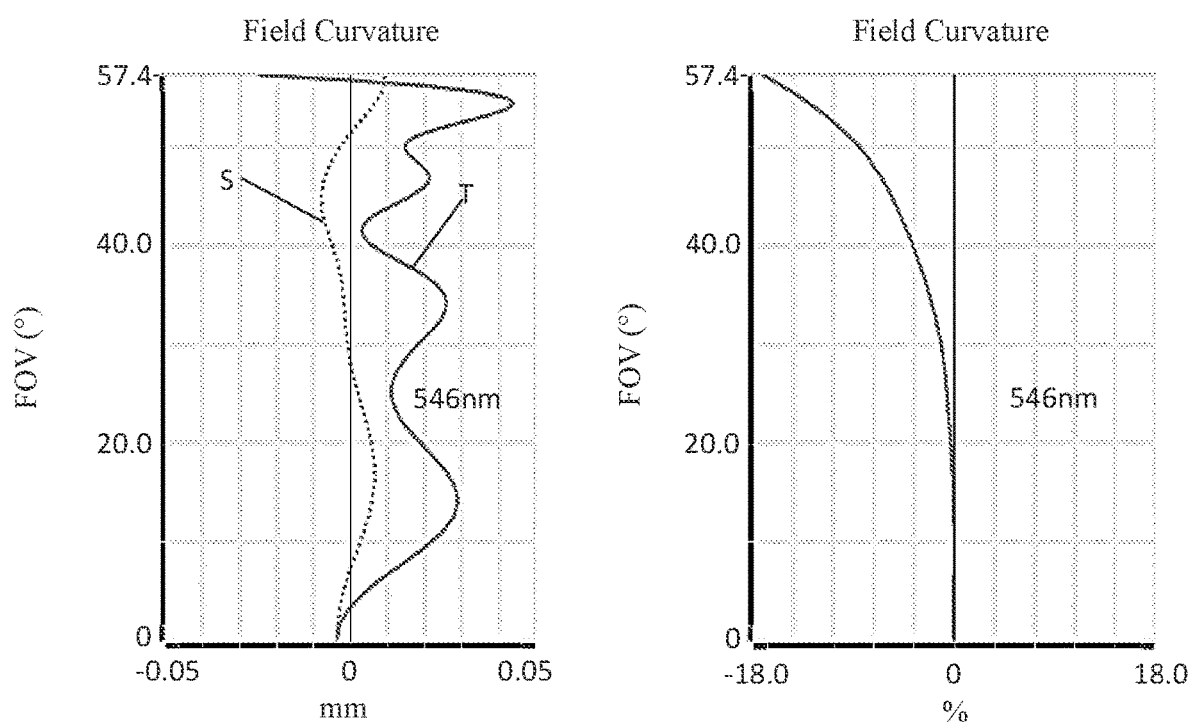
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 656 nm, 588 nm, 546 nm, 486 nm, and 436 nm after passing through the camera optical lens 10 according to Embodiment 1. FIG. 4 shows a schematic diagram of field curvature and distortion of light having a wavelength of 546 nm after passing through the camera optical lens 10 according to Embodiment 1. In FIG. 4, the field curvature S is the field curvature in a sagittal direction, and the field curvature T is the field curvature in a meridian direction.

In addition, the values corresponding to the various parameters and the parameters specified in the respective conditions in each of Embodiments 1, 2, 3, 4 and 5 are listed in Table 21.

As shown in Table 21, Embodiment 1 satisfies the respective conditions.

In this embodiment, an entrance pupil diameter ENPD of the camera optical lens 10 is 0.637 mm, the full field of view image height IH is 1.815 mm, and the FOV in a diagonal direction is 114.80°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Figure 5:
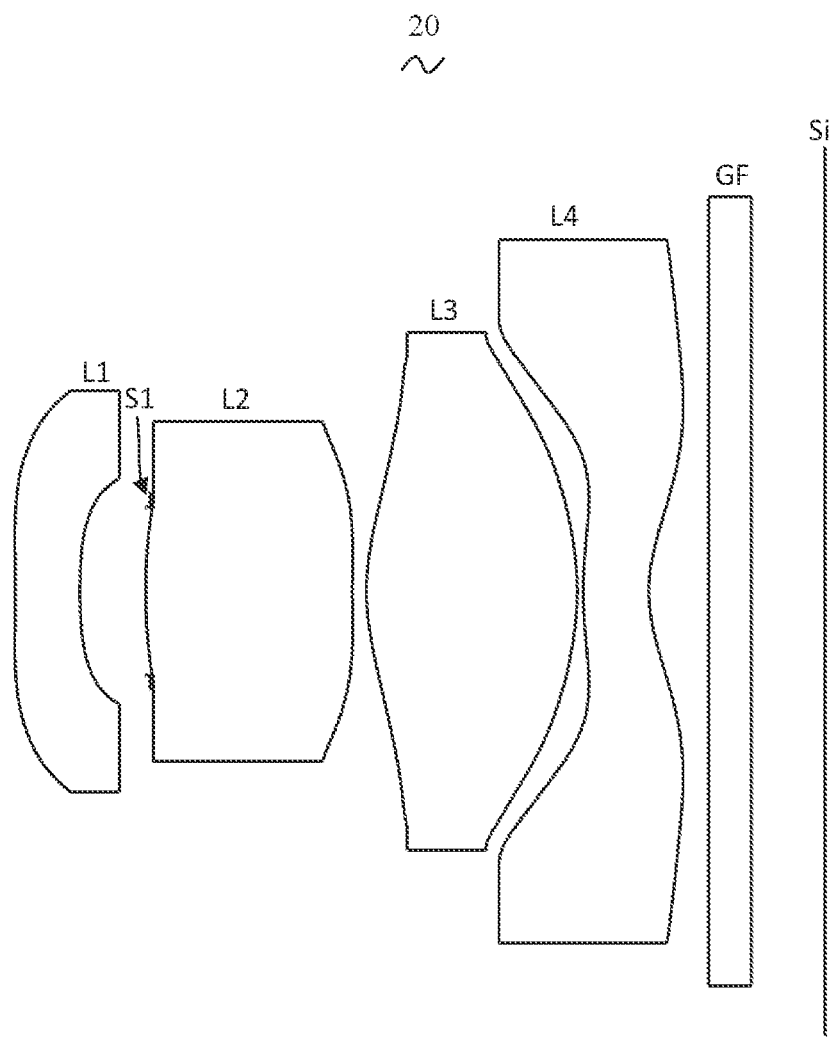
FIG. 5 is a schematic structural diagram of a camera optical lens according to Embodiment 2.

FIG. 5 is a schematic structural diagram of a camera optical lens 20 according to Embodiment 2. Embodiment 2 is basically the same as Embodiment 1, the symbols have the same representation as Embodiment 1, and only the difference from Embodiment 1 will be described in the following.

Table 5 shows the design data of the camera optical lens 20 according to Embodiment 2 of the present invention.

TABLE 5

|     | R      | d            | nd         | vd       |
|-----|--------|--------------|------------|----------|
| S1  | ∞      | d0= −0.668   |            |          |
| R1  | −4.759 | d1= 0.320    | nd1 1.5444 | v1 55.82 |
| R2  | 2.372  | d2= 0.328    |            |          |
| R3  | 2.640  | d3= 1.028    | nd2 1.5444 | v2 55.82 |
| R4  | 5.273  | d4= 0.069    |            |          |
| R5  | 0.852  | d5= 1.049    | nd3 1.5444 | v3 55.82 |
| R6  | −1.040 | d6= 0.030    |            |          |
| R7  | 1.594  | d7= 0.325    | nd4 1.6700 | v4 19.39 |
| R8  | 0.591  | d8= 0.300    |            |          |
| R9  | ∞      | d9= 0.210    | ndg 1.5168 | vg 64.17 |
| R10 | ∞      | d10= 0.367   |            |          |

Table 6 shows the aspherical surface data of the lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | −4.8119E+01 | 1.0711E+00 | −2.8963E+00 | 9.3786E+00 | −2.1920E+01 | 2.9827E+01 |
| R2 | 9.7071E+00 | 1.5499E+00 | 1.8548E+01 | −6.4143E+02 | 1.1215E+04 | −1.1535E+05 |
| R3 | 2.8298E+01 | 2.3988E−01 | −1.0528E+01 | 2.9615E+02 | −5.0023E+03 | 5.2172E+04 |
| R4 | 2.7864E+01 | −2.0034E+00 | 6.3955E+00 | −1.5411E+01 | 3.0312E+00 | 1.3251E+02 |
| R5 | −7.2519E+00 | −3.5664E−01 | 1.4907E+00 | −4.9720E+00 | 1.1006E+01 | −1.6940E+01 |
| R6 | −1.2430E+00 | 9.8594E−01 | −4.4503E+00 | 1.1621E+01 | −1.9838E+01 | 2.0879E+01 |
| R7 | −1.7001E+01 | −1.3612E−01 | −4.0459E+00 | 1.3375E+01 | −2.8815E+01 | 4.4466E+01 |
| R8 | −2.9385E+00 | −8.7056E−01 | 1.2393E+00 | −1.3197E+00 | 9.6162E−01 | −3.7044E−01 |

| | Cone coefficient | Aspherical coefficient | | | |
|---|---|---|---|---|---|
| | k | A14 | A16 | A18 | A20 |
| R1 | −4.8119E+01 | −9.3618E+00 | −3.1826E+01 | 4.3983E+01 | −1.7956E+01 |
| R2 | 9.7071E+00 | 7.2565E+05 | −2.7304E+06 | 5.6430E+06 | −4.9123E+06 |
| R3 | 2.8298E+01 | −3.4116E+05 | 1.3554E+06 | −2.9847E+06 | 2.7747E+06 |
| R4 | 2.7864E+01 | −4.8203E+02 | 8.3527E+02 | −7.4876E+02 | 2.8217E+02 |
| R5 | −7.2519E+00 | 1.8976E+01 | −1.5167E+01 | 7.5404E+00 | −1.6703E+00 |
| R6 | −1.2430E+00 | −1.1394E+01 | 1.3257E+00 | 1.3804E+00 | −4.3724E−01 |
| R7 | −1.7001E+01 | −4.4570E+01 | 2.6767E+01 | −8.6867E+00 | 1.1686E+00 |
| R8 | −2.9385E+00 | 1.8284E−02 | 3.8880E−02 | −1.3016E−02 | 1.3142E−03 |

Table 7 and Table 8 show the design data of the inflection point and stagnation point of each lens in the camera optical lens 20 according to this embodiment of the present invention.

TABLE 7

| | Number of inflection points | Inflection point position 1 | Inflection point position 2 | Inflection point position 2 | Inflection point position 4 | Inflection point position 5 |
|---|---|---|---|---|---|---|
| P1R1 | 1 | 0.135 | / | / | / | / |
| P1R2 | 0 | / | / | / | / | / |
| P2R1 | 0 | / | / | / | / | / |
| P2R2 | 2 | 0.095 | 0.665 | / | / | / |
| P3R1 | 2 | 0.465 | 0.935 | / | / | / |
| P3R2 | 1 | 1.025 | / | / | / | / |
| P4R1 | 2 | 0.245 | 0.885 | / | / | / |
| P4R2 | 5 | 0.345 | 1.115 | 1.155 | 1.395 | 1.455 |

TABLE 8

| | Number of stagnation points | Stagnation point position 1 |
|---|---|---|
| P1R1 | 1 | 0.235 |
| P1R2 | 0 | / |
| P2R1 | 0 | / |
| P2R2 | 1 | 0.165 |
| P3R1 | 0 | / |
| P3R2 | 0 | / |
| P4R1 | 1 | 0.405 |
| P4R2 | 1 | 0.815 |

Figure 6:
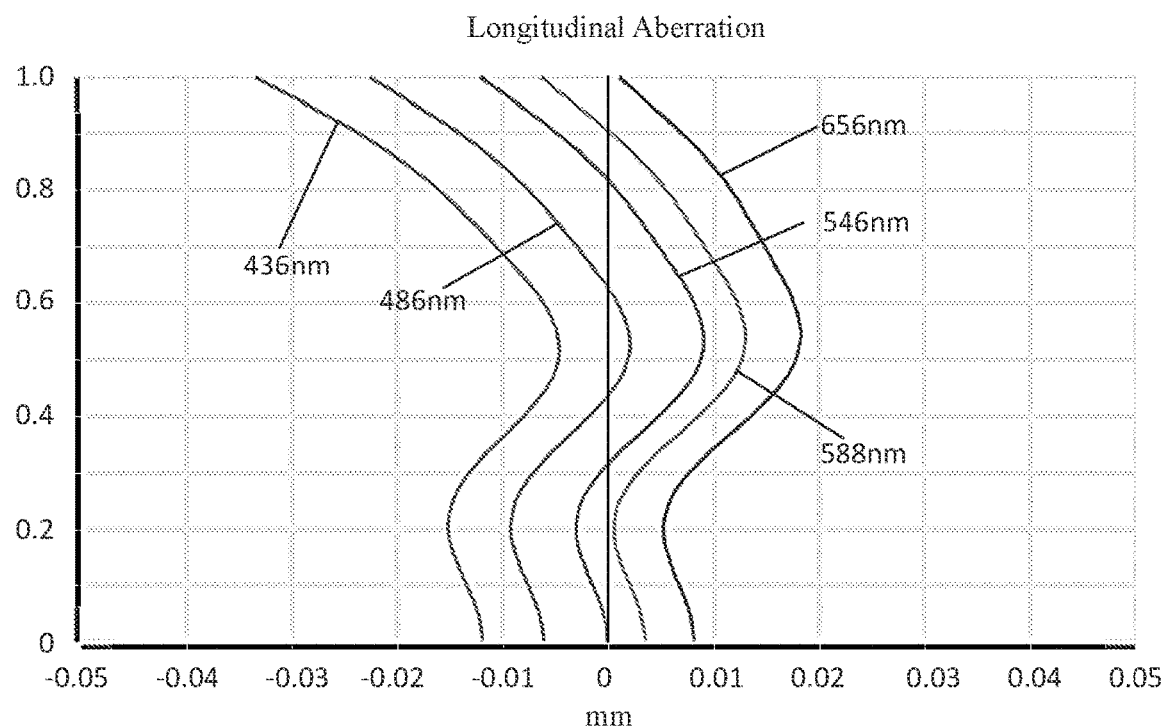
FIG. 6 is a schematic diagram of longitudinal aberration of the camera optical lens shown in FIG. 5.
Figure 7:
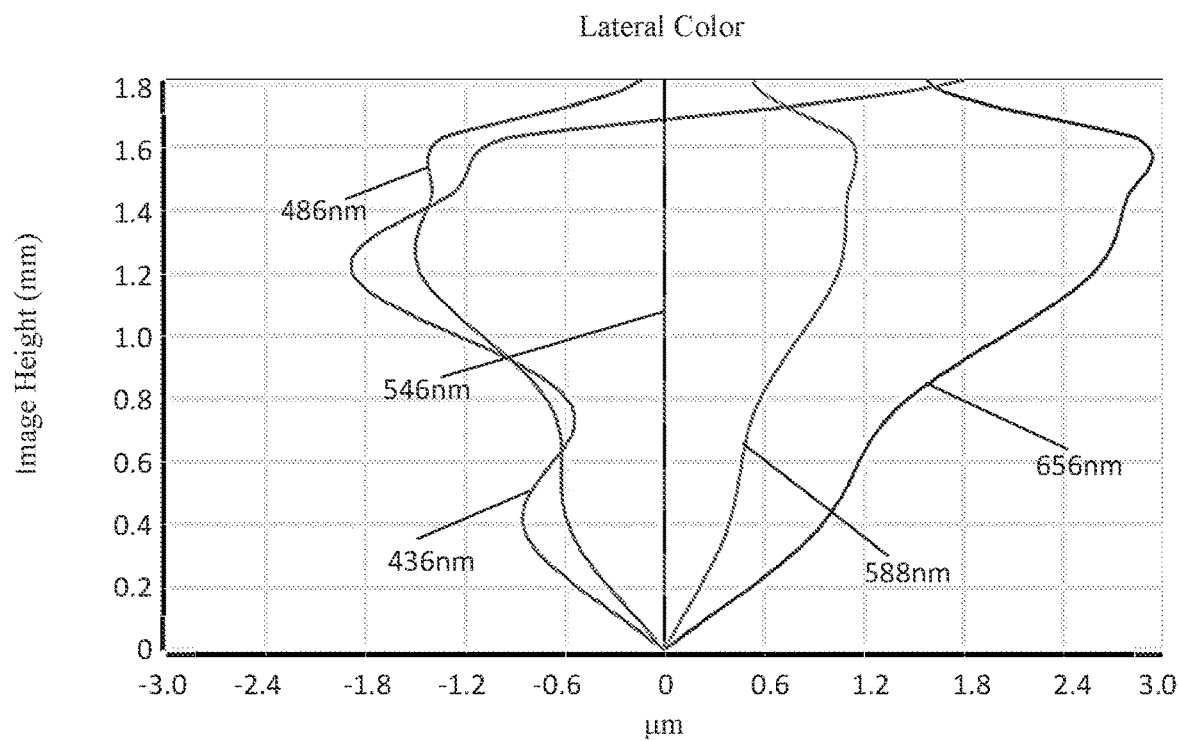
FIG. 7 is a schematic diagram of lateral color of the camera optical lens shown in FIG. 5.
Figure 8:
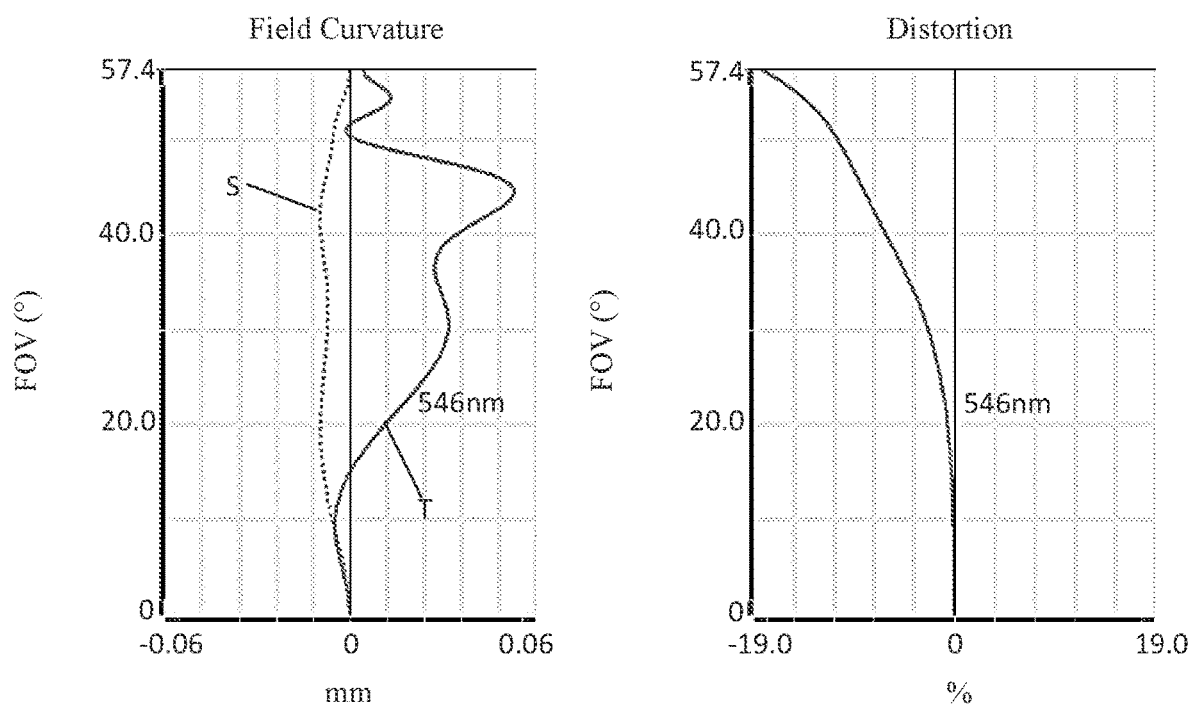
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 656 nm, 588 nm, 546 nm, 486 nm, and 436 nm after passing through the camera optical lens 20 according to Embodiment 2. FIG. 8 shows a schematic diagram of field curvature and distortion of light having a wavelength of 546 nm after passing through the camera optical lens 20 according to Embodiment 2. In FIG. 8, the field curvature S is the field curvature in a sagittal direction, and the field curvature T is the field curvature in a meridian direction.

In addition, the values corresponding to the various parameters and the parameters specified in the conditions in Embodiment 2 are listed in Table 21.

As shown in Table 21, Embodiment 2 satisfies the respective conditions.

In this embodiment, an entrance pupil diameter ENPD of the camera optical lens 20 is 0.646 mm, the full field of view image height IH is 1.815 mm, and the FOV in a diagonal direction is 114.80°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Figure 9:
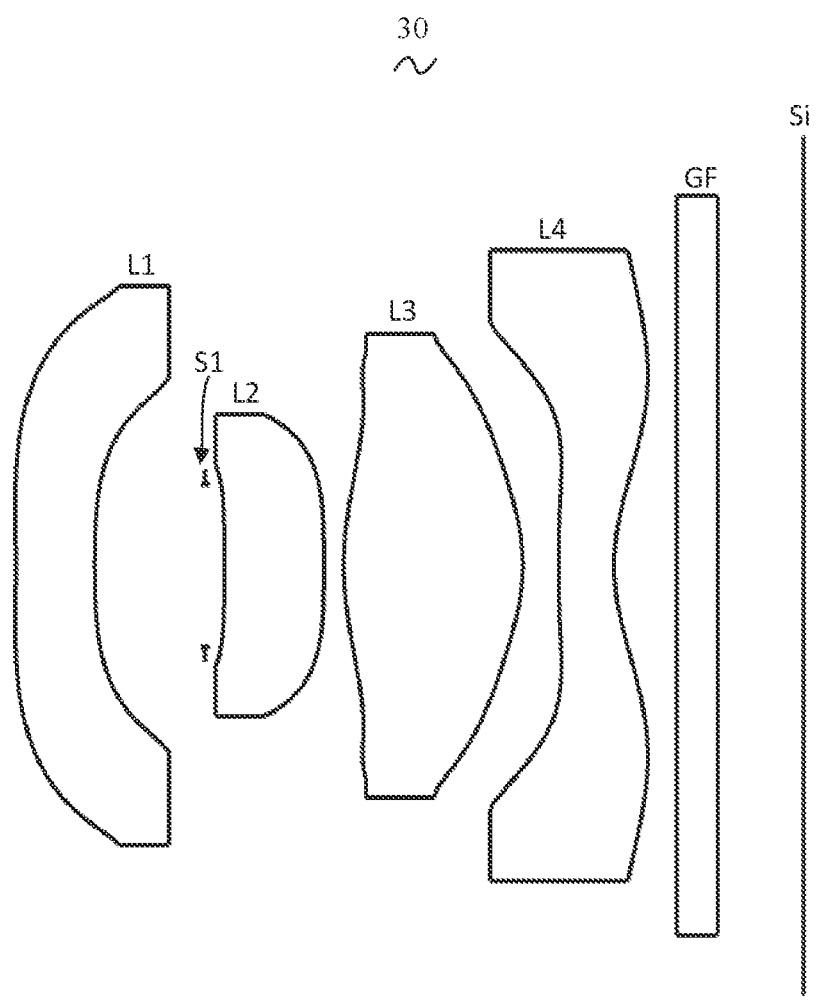
FIG. 9 is a schematic structural diagram of a camera optical lens according to Embodiment 3.

FIG. 9 is a schematic structural diagram of a camera optical lens 30 according to Embodiment 3. Embodiment 3 is basically the same as Embodiment 1, the symbols have the same representation as Embodiment 1, and only the difference from Embodiment 1 will be described in the following.

In this embodiment, the second lens L2 has a negative refractive power, the object side surface of the second lens L2 is a concave surface at a paraxial position, and the image side surface of the second lens L2 is a convex surface at a paraxial position.

Table 9 shows the design data of the camera optical lens 30 according to Embodiment 3 of the present invention.

TABLE 9

| | R | d | nd | vd |
|---|---|---|---|---|
| S1 | ∞ | d0= −0.968 | | |
| R1 | −8.838 | d1= 0.403 | nd1 1.5444 | v1 55.82 |
| R2 | 4.017 | d2= 0.664 | | |
| R3 | −10.801 | d3= 0.510 | nd2 1.5444 | v2 55.82 |
| R4 | −11.939 | d4= 0.102 | | |
| R5 | 1.231 | d5= 0.915 | nd3 1.5444 | v3 55.82 |
| R6 | −0.726 | d6= 0.183 | | |
| R7 | 6.418 | d7= 0.283 | nd4 1.6700 | v4 19.39 |
| R8 | 0.803 | d8= 0.322 | | |
| R9 | ∞ | d9= 0.210 | ndg 1.5168 | vg 64.17 |
| R10 | ∞ | d10= 0.437 | | |

Table 10 shows the aspherical surface data of the lenses in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | 4.4977E+01 | 4.1408E−01 | −1.3888E−01 | −9.2790E−01 | 3.5145E+00 | −6.4819E+00 |
| R2 | 1.7651E+01 | 6.0000E−01 | 8.1925E−01 | −7.0663E+00 | 9.0283E+00 | 9.7309E+01 |
| R3 | 9.3149E+01 | −5.9616E−01 | 5.1958E+00 | −1.4084E+02 | 1.6612E+03 | −1.0384E+04 |
| R4 | −2.3941E+02 | −1.1651E+00 | −2.2039E+00 | 5.5324E+01 | −5.6476E+02 | 3.2967E+03 |
| R5 | −6.5256E+00 | −2.4566E−01 | 4.1260E−01 | −2.0150E−01 | −6.5870E+00 | 2.6909E+01 |
| R6 | −1.8564E+00 | 1.1900E+00 | −5.0444E+00 | 1.7113E+01 | −4.4094E+01 | 7.7994E+01 |
| R7 | 3.3343E+01 | 5.2193E−01 | −4.7314E+00 | 1.2792E+01 | −1.9994E+01 | 1.1315E+01 |
| R8 | −1.1202E+00 | −7.9908E−01 | 3.9634E−01 | 5.5918E−01 | −1.6419E+00 | 1.9237E+00 |

| | Cone coefficient | Aspherical coefficient | | | |
|---|---|---|---|---|---|
| | k | A14 | A16 | A18 | A20 |
| R1 | 4.4977E+01 | 7.2107E+00 | −4.8480E+00 | 1.8148E+00 | −2.9005E−01 |
| R2 | 1.7651E+01 | −5.0778E+02 | 1.0874E+03 | −1.1179E+03 | 4.4791E+02 |
| R3 | 9.3149E+01 | 2.4710E+04 | 4.9075E+04 | −3.7931E+05 | 5.8522E+05 |
| R4 | −2.3941E+02 | −1.1869E+04 | 2.5852E+04 | −3.1209E+04 | 1.5972E+04 |
| R5 | −6.5256E+00 | −5.4341E+01 | 6.3242E+01 | −3.9270E+01 | 9.9555E+00 |
| R6 | −1.8564E+00 | −9.2523E+01 | 7.0949E+01 | −3.1892E+01 | 6.3976E+00 |
| R7 | 3.3343E+01 | 1.3496E+01 | −2.6586E+01 | 1.6488E+01 | −3.6798E+00 |
| R8 | −1.1202E+00 | −1.2585E+00 | 4.7459E−01 | −9.6312E−02 | 8.1393E−03 |

Table 11 and Table 12 show the design data of the inflection point and the stagnation point of each lens in the camera optical lens 30 according to this embodiment of the present invention.

TABLE 11

| | Number of inflection points | Inflection point position 1 | Inflection point position 2 | Inflection point position 3 |
|---|---|---|---|---|
| P1R1 | 2 | 0.155 | 1.205 | / |
| P1R2 | 2 | 0.765 | 0.835 | / |
| P2R1 | 0 | / | / | / |
| P2R2 | 0 | / | / | / |
| P3R1 | 2 | 0.425 | 0.805 | / |
| P3R2 | 1 | 0.945 | / | / |

TABLE 11-continued

| | Number of inflection points | Inflection point position 1 | Inflection point position 2 | Inflection point position 3 |
|---|---|---|---|---|
| P4R1 | 2 | 0.305 | 1.025 | / |
| P4R2 | 3 | 0.405 | 1.325 | 1.415 |

TABLE 12

| | Number of stagnation points | Stagnation point position 1 | Stagnation point position 2 |
|---|---|---|---|
| P1R1 | 1 | 0.275 | / |
| P1R2 | 0 | / | / |
| P2R1 | 0 | / | / |
| P2R2 | 0 | / | / |
| P3R1 | 2 | 0.725 | 0.855 |
| P3R2 | 1 | 1.035 | / |
| P4R1 | 1 | 0.445 | / |
| P4R2 | 1 | 0.865 | / |

Figure 10:
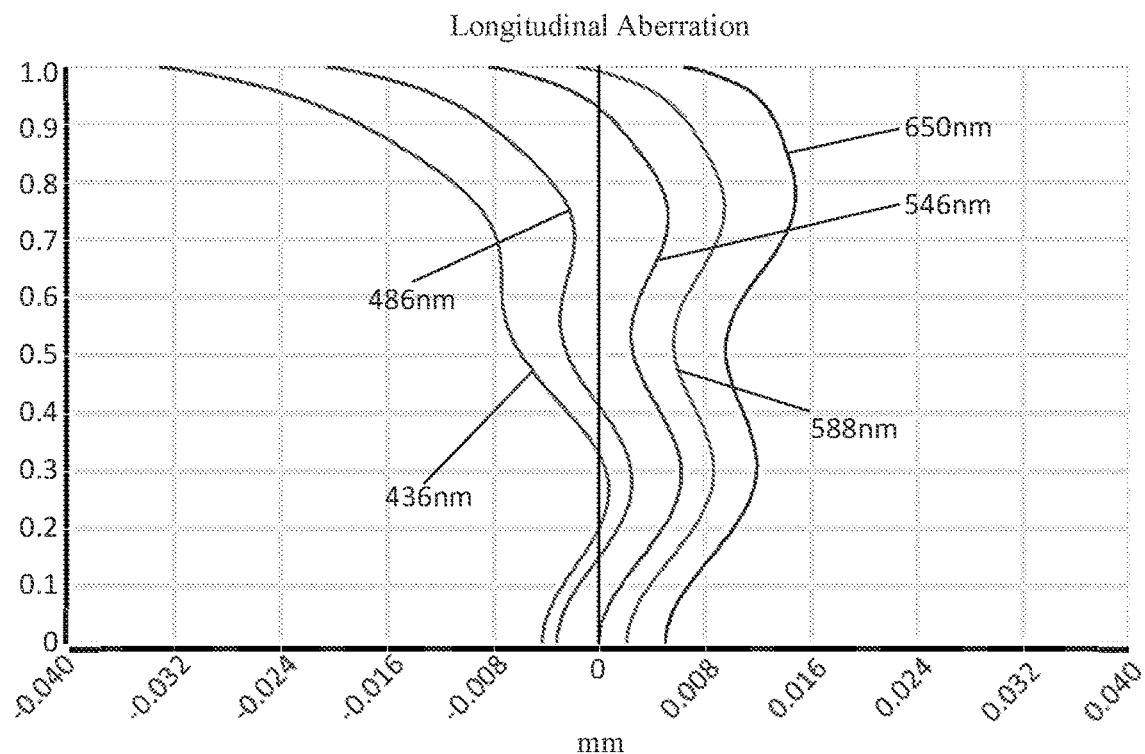
FIG. 10 is a schematic diagram of longitudinal aberration of the camera optical lens shown in FIG. 9.
Figure 11:
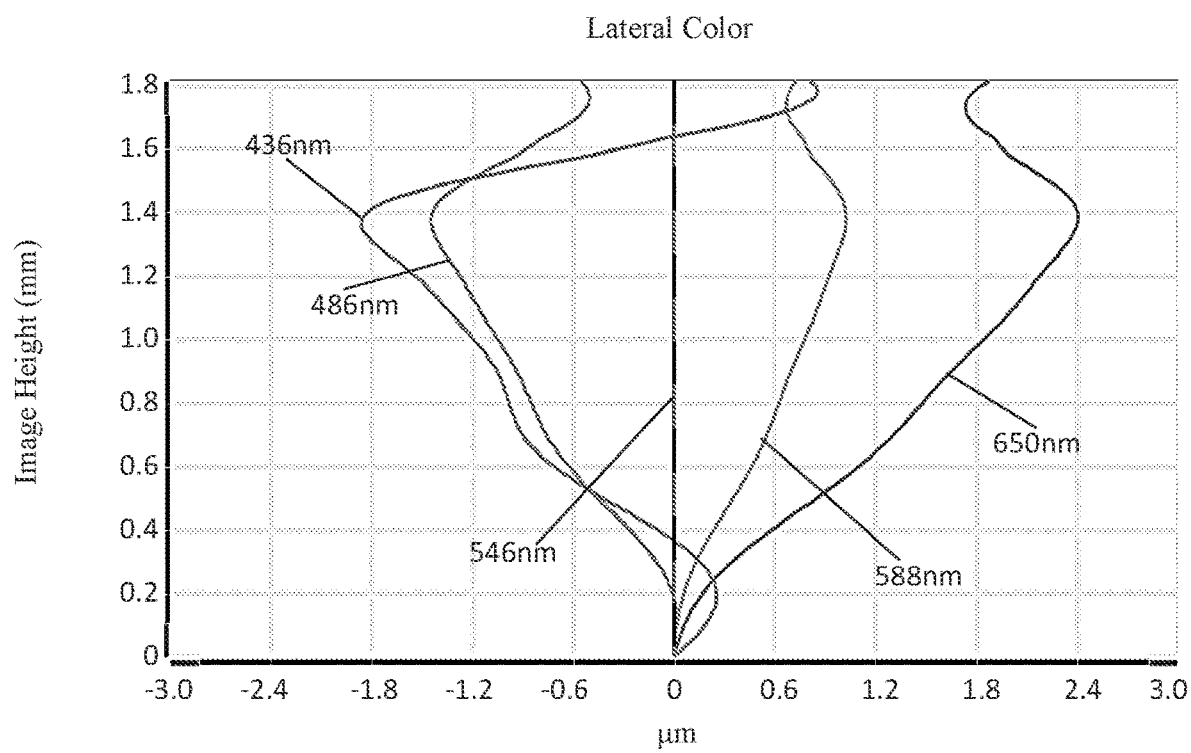
FIG. 11 is a schematic diagram of lateral color of the camera optical lens shown in FIG. 9.
Figure 12:
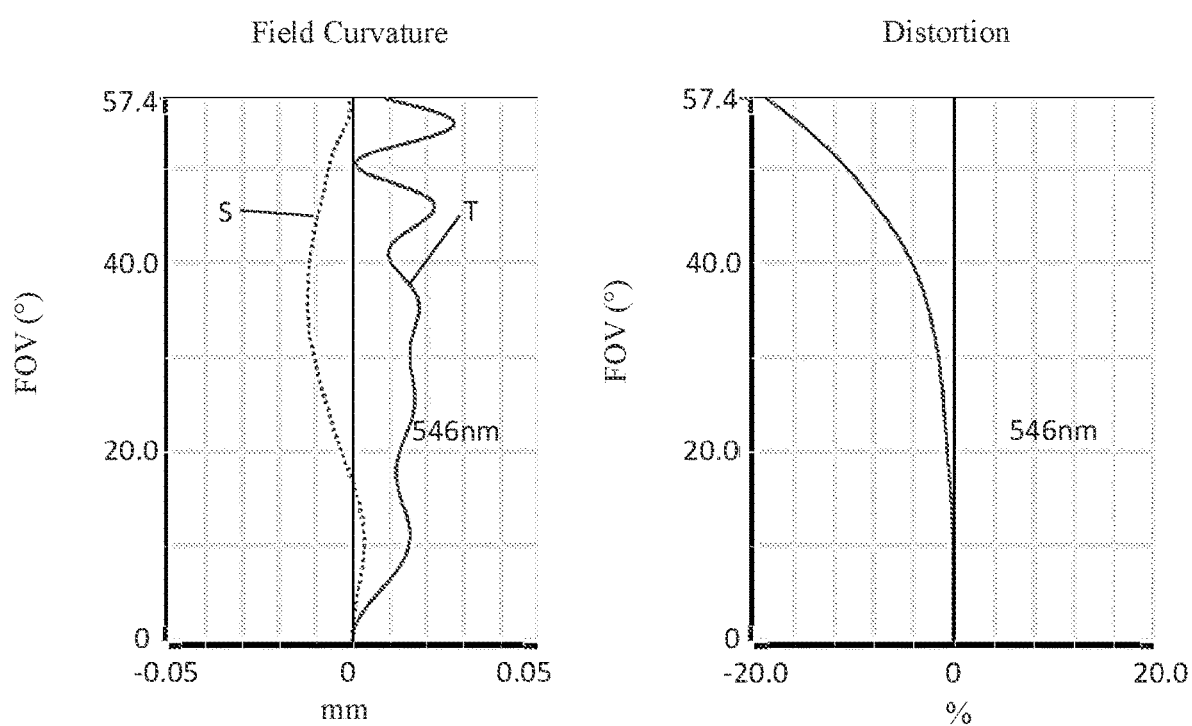
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 650 nm, 588 nm, 546 nm, 486 nm, and 436 nm after passing through the camera optical lens 30 according to Embodiment 3. FIG. 12 shows a schematic diagram of field curvature and distortion of light having a wavelength of 546 nm after passing through the camera optical lens 30 according to Embodiment 3. In FIG. 12, the field curvature S is the field curvature in a sagittal direction, and the field curvature T is the field curvature in a meridian direction.

In addition, the values corresponding to the various parameters and the parameters specified in the conditions in Embodiment 3 are listed in Table 21.

As shown in Table 21, Embodiment 3 satisfies the respective conditions.

In this embodiment, an entrance pupil diameter ENPD of the camera optical lens 30 is 0.650 mm, the full field of view image height IH is 1.815 mm, and the FOV in a diagonal direction is 114.80°, so that the camera optical lens 30 can meet the design requirements of a large aperture, a wide angle and ultra-thinness. The on-axis and off-axis color aberrations are fully corrected, and the camera optical lens 30 has excellent optical performance.

Embodiment 4

Figure 13:
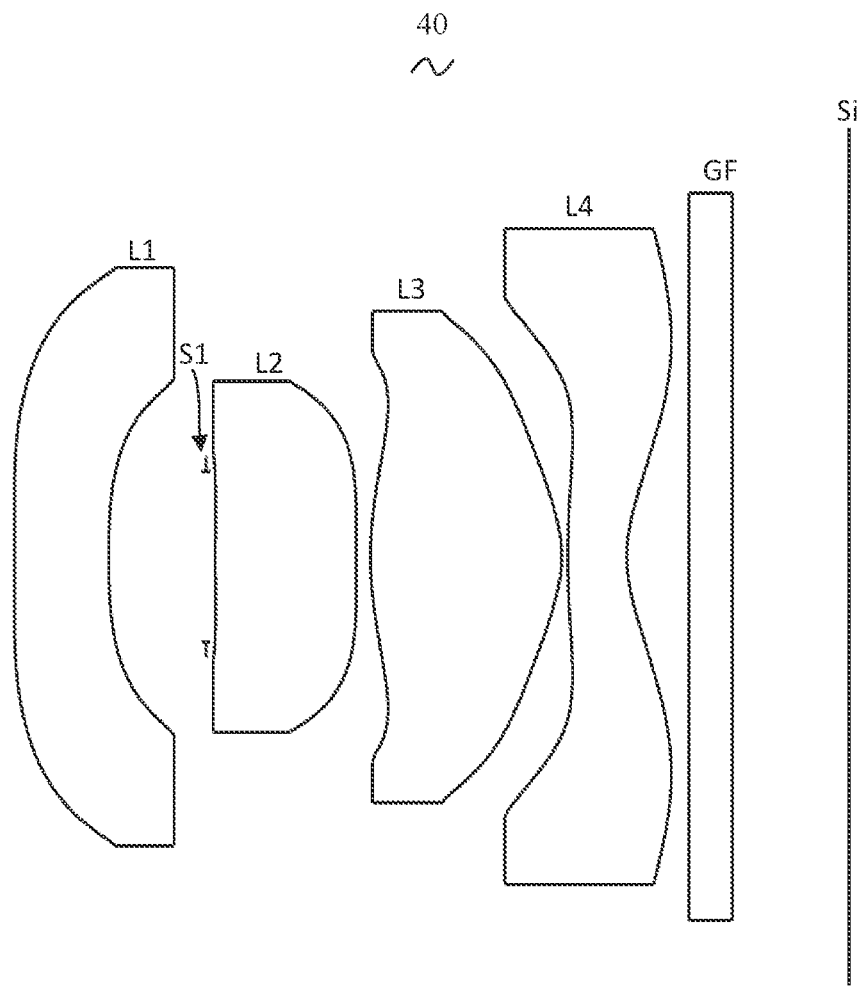
FIG. 13 is a schematic structural diagram of a camera optical lens according to Embodiment 4.

FIG. 13 is a schematic structural diagram of a camera optical lens 40 according to Embodiment 4. Embodiment 4 is basically the same as Embodiment 1, the symbols have the same representation as Embodiment 1, and only the difference from Embodiment 1 will be described in the following.

Table 13 shows the design data of the camera optical lens 40 according to Embodiment 4 of the present invention.

TABLE 13

| | R | d | nd | vd |
|---|---|---|---|---|
| S1 | ∞ | d0= −0.923 | | |
| R1 | −15.285 | d1= 0.454 | nd1 1.5444 | v1 55.82 |
| R2 | 3.060 | d2= 0.516 | | |
| R3 | 14.414 | d3= 0.681 | nd2 1.5444 | v2 55.82 |
| R4 | 15.938 | d4= 0.068 | | |
| R5 | 1.231 | d5= 0.923 | nd3 1.5444 | v3 55.82 |
| R6 | −0.487 | d6= 0.030 | | |
| R7 | 4.078 | d7= 0.283 | nd4 1.6700 | v4 19.39 |
| R8 | 0.510 | d8= 0.300 | | |
| R9 | ∞ | d9= 0.210 | ndg 1.5168 | vg 64.17 |
| R10 | ∞ | d10= 0.563 | | |

Table 14 shows the aspherical surface data of the lenses in the camera optical lens 40 according to Embodiment 4 of the present invention.

TABLE 14

| | Cone coefficient | Aspherical coefficient | | | | |
|---|---|---|---|---|---|---|
| | k | A4 | A6 | A8 | A10 | A12 |
| R1 | −9.9000E+01 | 3.6795E−01 | −2.2904E−01 | −2.6071E−01 | 1.6155E+00 | −3.4295E+00 |
| R2 | 1.4598E+01 | 7.7136E−01 | −2.3005E+00 | 2.6594E+01 | −2.3152E+02 | 1.2413E+03 |
| R3 | −9.9000E+01 | −2.1387E−01 | −5.1409E+00 | 1.7740E+02 | −3.8356E+03 | 4.9176E+04 |
| R4 | 9.0249E+01 | −1.3076E+00 | 1.4520E+00 | 1.7690E+01 | −2.4699E+02 | 1.4138E+03 |
| R5 | −7.5744E+00 | −5.0815E−01 | 3.4283E+00 | −1.8444E+01 | 6.1569E+01 | −1.3516E+02 |
| R6 | −2.4032E+00 | 2.5030E+00 | −1.7806E+01 | 8.1379E+01 | −2.4140E+02 | 4.6470E+02 |
| R7 | 8.9129E+00 | 5.7145E−01 | −6.5203E+00 | 2.5767E+01 | −6.3384E+01 | 9.5862E+01 |
| R8 | −5.7097E+00 | −1.8057E−01 | 4.3057E−02 | −5.0310E−02 | 1.1516E−02 | 8.4340E−02 |

| | Cone coefficient | Aspherical coefficient | | | |
|---|---|---|---|---|---|
| | k | A14 | A16 | A18 | A20 |
| R1 | −9.9000E+01 | 4.2642E+00 | −3.1714E+00 | 1.3026E+00 | −2.2639E−01 |
| R2 | 1.4598E+01 | −4.0201E+03 | 7.7157E+03 | −8.0363E+03 | 3.4665E+03 |
| R3 | −9.9000E+01 | −3.8601E+05 | 1.8090E+06 | −4.6531E+06 | 5.0817E+06 |
| R4 | 9.0249E+01 | −4.6420E+03 | 9.0039E+03 | −9.5889E+03 | 4.3146E+03 |
| R5 | −7.5744E+00 | 1.7721E+02 | −1.1449E+02 | 8.4702E+00 | 1.9585E+01 |
| R6 | −2.4032E+00 | −5.7970E+02 | 4.5274E+02 | −2.0121E+02 | 3.8834E+01 |
| R7 | 8.9129E+00 | −8.9502E+01 | 5.0789E+01 | −1.6214E+01 | 2.2567E+00 |
| R8 | −5.7097E+00 | −9.7236E−02 | 4.6025E−02 | −1.0268E−02 | 8.8857E−04 |

Table 15 and Table 16 show the design data of the inflection point and the stagnation point of each lens in the camera optical lens 40 according to this embodiment of the present invention.

TABLE 15

|  | Number of inflection points | Inflection point position 1 | Inflection point position 2 |
|---|---|---|---|
| P1R1 | 2 | 0.125 | 1.195 |
| P1R2 | 2 | 0.705 | 0.745 |
| P2R1 | 2 | 0.145 | 0.435 |
| P2R2 | 2 | 0.065 | 0.725 |
| P3R1 | 2 | 0.415 | 0.825 |
| P3R2 | 1 | 0.995 | / |
| P4R1 | 2 | 0.315 | 0.985 |
| P4R2 | 2 | 0.385 | 1.325 |

TABLE 16

|  | Number of stagnation points | Stagnation point position 1 |
|---|---|---|
| P1R1 | 1 | 0.215 |
| P1R2 | 0 | / |
| P2R1 | 1 | 0.235 |
| P2R2 | 1 | 0.115 |
| P3R1 | 1 | 0.645 |
| P3R2 | 0 | / |
| P4R1 | 1 | 0.495 |
| P4R2 | 1 | 0.915 |

Figure 14:
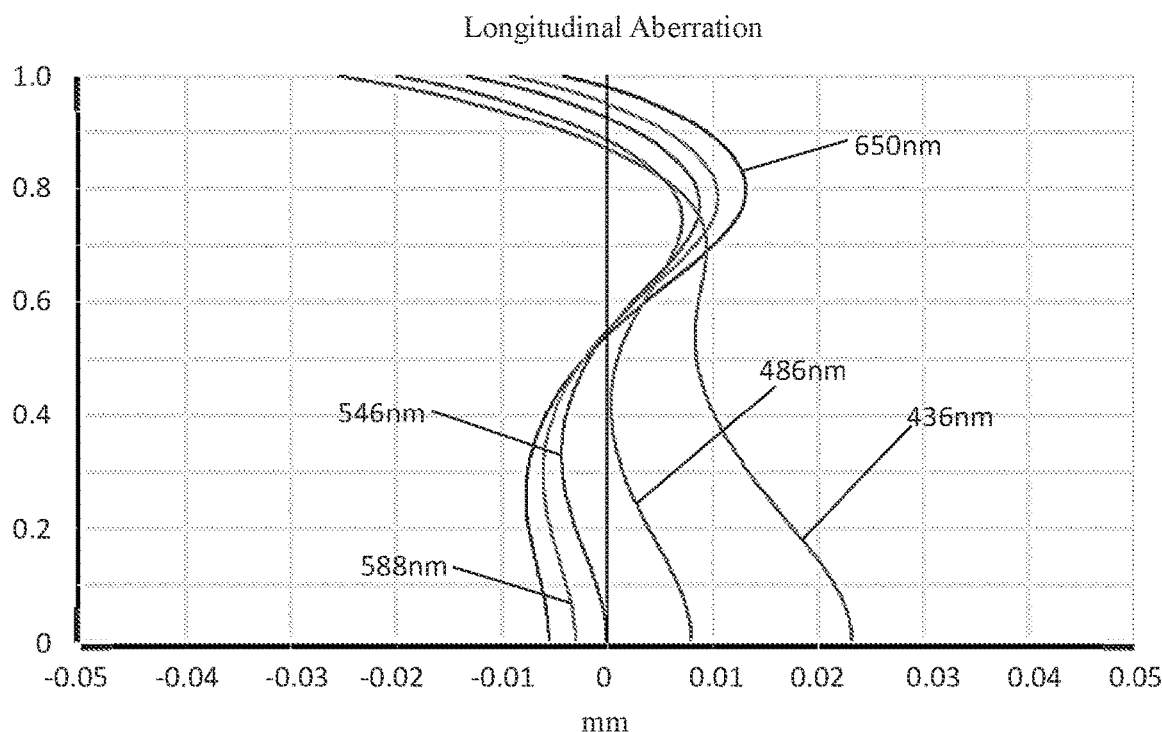
FIG. 14 is a schematic diagram of longitudinal aberration of the camera optical lens shown in FIG. 13.
Figure 15:
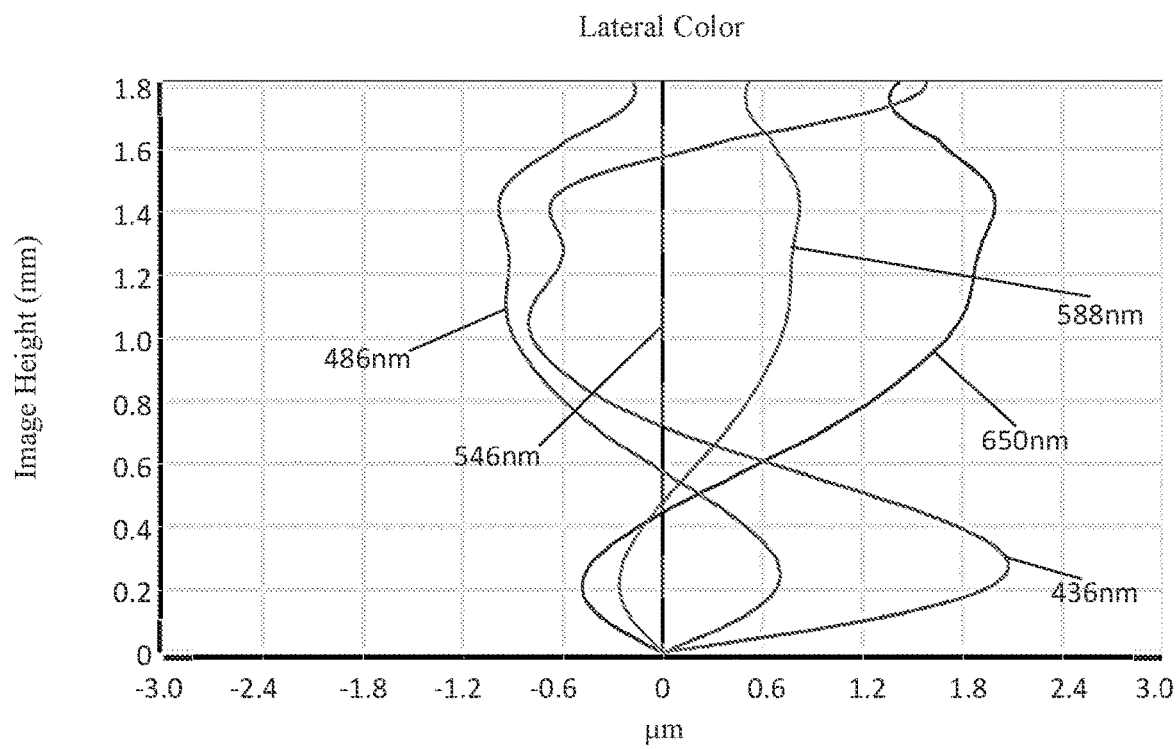
FIG. 15 is a schematic diagram of lateral color of the camera optical lens shown in FIG. 13.
Figure 16:
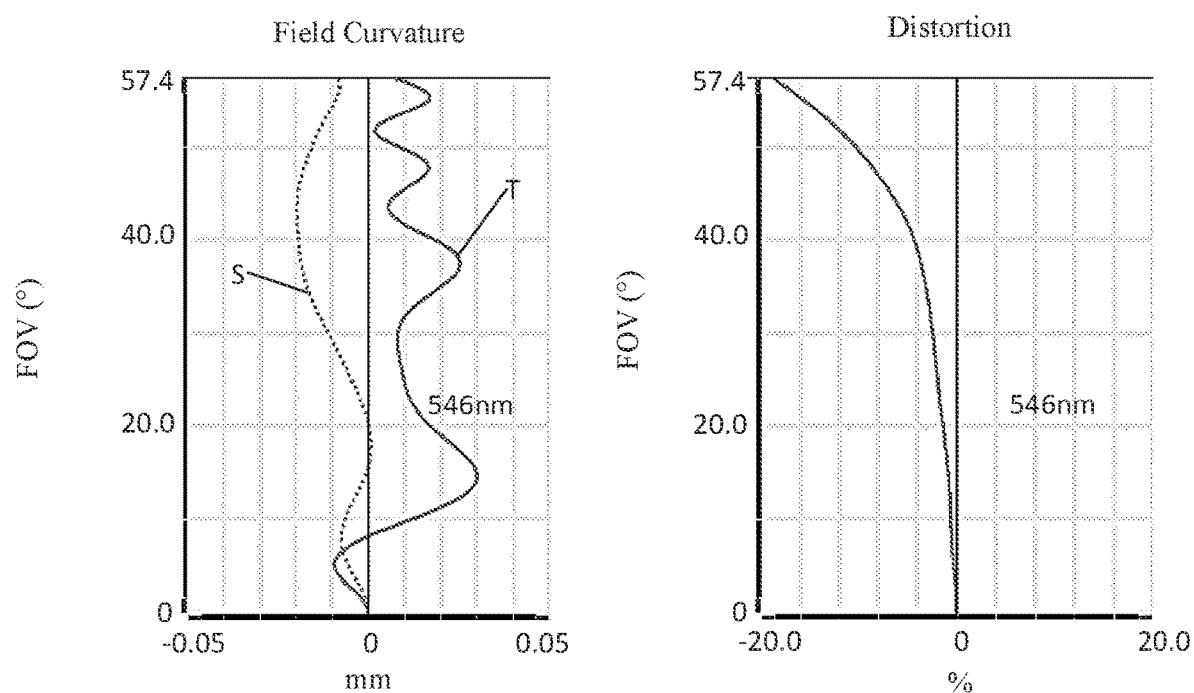
FIG. 16 is a schematic diagram of field curvature and distortion of the camera optical lens shown in FIG. 13.

FIG. 14 and FIG. 15 respectively show schematic diagrams of longitudinal aberration and lateral color of light having wavelengths of 650 nm, 588 nm, 546 nm, 486 nm, and 436 nm after passing through the camera optical lens 40 according to Embodiment 4. FIG. 16 shows a schematic diagram of field curvature and distortion of light having a wavelength of 546 nm after passing through the camera optical lens 40 according to Embodiment 4. In FIG. 16, the field curvature S is the field curvature in a sagittal direction, and the field curvature T is the field curvature in a meridian direction.

In addition, the values corresponding to the various parameters and the parameters specified in the conditions in Embodiment 4 are listed in Table 21.

As shown in Table 21, Embodiment 4 satisfies the respective conditions.

In this embodiment, an entrance pupil diameter ENPD of the camera optical lens 40 is 0.650 mm, the full field of view image height IH is 1.815 mm, and the FOV in a diagonal direction is 114.80°, so that the camera optical lens 40 can meet the design requirements of a large aperture, a wide angle and ultra-thinness. The on-axis and off-axis color aberrations are fully corrected, and the camera optical lens 40 has excellent optical performance.

Embodiment 5

Figure 17:
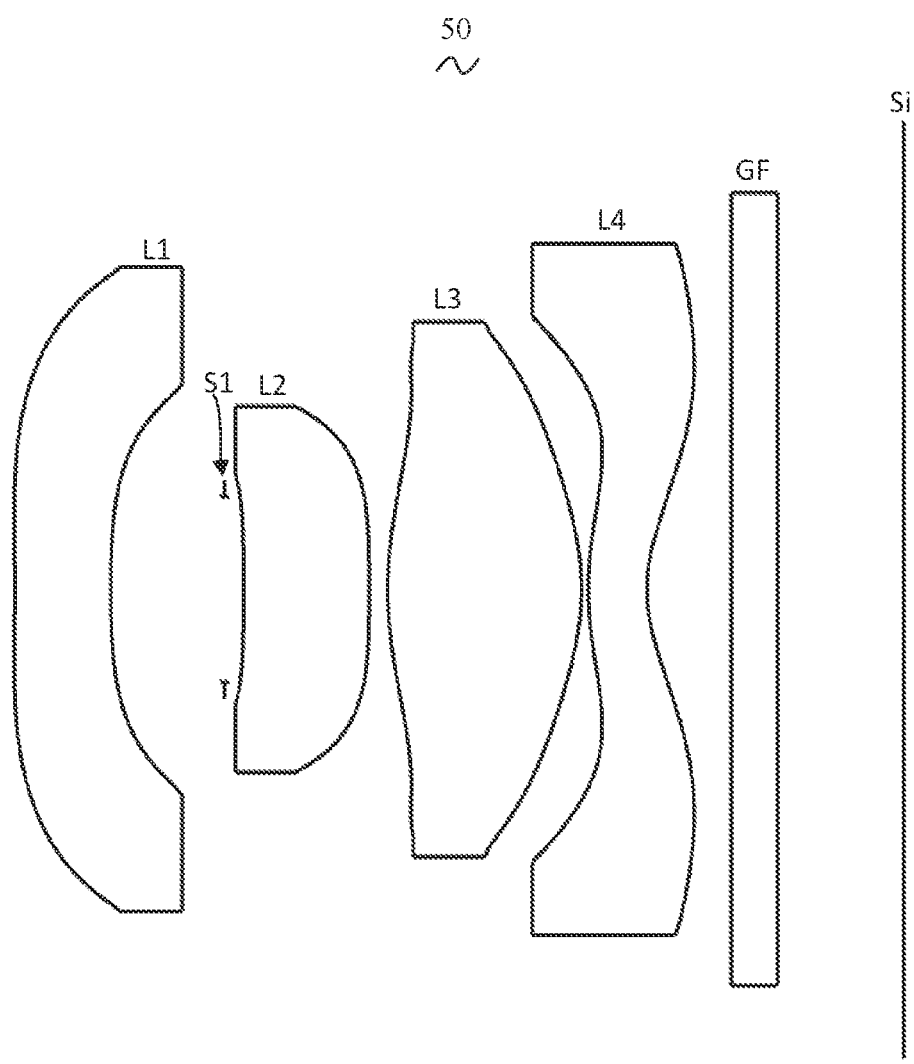
FIG. 17 is a schematic structural diagram of a camera optical lens according to Embodiment 5.

FIG. 17 is a schematic structural diagram of a camera optical lens 50 according to Embodiment 5. Embodiment 5 is basically the same as Embodiment 1, the symbols have the same representation as Embodiment 1, and only a difference from Embodiment 1 will be described in the following.

In this embodiment, the second lens L2 has a negative refractive power, the object side surface of the second lens L2 is a concave surface at a paraxial position, and the image side surface of the second lens L2 is a convex surface at a paraxial position.

Table 17 shows the design data of the camera optical lens 50 according to Embodiment 5 of the present invention.

TABLE 17

|  | R | d | nd | vd |
|---|---|---|---|---|
| S1 | ∞ | d0= −0.950 |  |  |
| R1 | −8.078 | d1= 0.434 | nd1 1.5444 | v1 55.82 |
| R2 | 4.039 | d2= 0.602 |  |  |
| R3 | −11.829 | d3= 0.568 | nd2 1.5444 | v2 55.82 |
| R4 | −23.657 | d4= 0.085 |  |  |
| R5 | 1.244 | d5= 0.878 | nd3 1.5444 | v3 55.82 |
| R6 | −0.816 | d6= 0.030 |  |  |
| R7 | 1.059 | d7= 0.266 | nd4 1.6700 | v4 19.39 |
| R8 | 0.522 | d8= 0.381 |  |  |
| R9 | ∞ | d9= 0.210 | ndg 1.5168 | vg 64.17 |
| R10 | ∞ | d10= 0.573 |  |  |

Table 18 shows the aspherical surface data of the lenses in the camera optical lens 50 according to Embodiment 5 of the present invention.

TABLE 18

|  | Cone coefficient | Aspherical coefficient | | | | |
|---|---|---|---|---|---|---|
|  | k | A4 | A6 | A8 | A10 | A12 |
| R1 | −9.7028E+01 | 3.8559E−01 | −2.6140E−01 | −3.3558E−01 | 1.8712E+00 | −3.6390E+00 |
| R2 | 1.9847E+01 | 6.4182E−01 | 4.1625E−01 | −5.5612E+00 | 3.1555E+00 | 1.2969E+02 |
| R3 | 9.9000E+01 | −4.9423E−01 | 4.2453E+00 | −1.4541E+02 | 2.1130E+03 | −1.7478E+04 |
| R4 | −1.4499E+02 | −1.0999E+00 | −2.5699E+00 | 5.0012E+01 | −4.4723E+02 | 2.3825E+03 |
| R5 | −6.1684E+00 | −1.7737E−01 | −2.3599E−01 | 2.7783E+00 | −1.2871E+01 | 3.0071E+01 |
| R6 | −1.6921E+00 | 9.2315E−01 | −3.8864E+00 | 1.4357E+01 | −4.0282E+01 | 7.6470E+01 |
| R7 | −5.9044E+00 | −3.7717E−01 | −1.5211E+00 | 6.1613E+00 | −1.4573E+01 | 1.9880E+01 |
| R8 | −3.3673E+00 | −5.4589E−01 | 5.4574E−01 | −4.3853E−01 | 2.0077E−01 | 4.8208E−02 |

|  | Cone coefficient | Aspherical coefficient | | | |
|---|---|---|---|---|---|
|  | k | A14 | A16 | A18 | A20 |
| R1 | −9.7028E+01 | 4.0934E+00 | −2.7510E+00 | 1.0245E+00 | −1.6238E−01 |
| R2 | 1.9847E+01 | −6.4068E+02 | 1.3930E+03 | −1.4744E+03 | 6.1179E+02 |
| R3 | 9.9000E+01 | 8.0870E+04 | −2.0236E+05 | 2.4289E+05 | −8.8350E+04 |
| R4 | −1.4499E+02 | −7.9708E+03 | 1.6291E+04 | −1.8555E+04 | 8.9937E+03 |
| R5 | −6.1684E+00 | −3.9626E+01 | 2.8900E+01 | −9.6428E+00 | 6.6919E−01 |
| R6 | −1.6921E+00 | −9.6482E+01 | 7.8349E+01 | −3.7205E+01 | 7.8455E+00 |
| R7 | −5.9044E+00 | −1.4157E+01 | 4.3362E+00 | −1.2735E−01 | −9.2003E−02 |
| R8 | −3.3673E+00 | −1.1707E−01 | 6.0845E−02 | −1.3921E−02 | 1.2114E−03 |

Table 19 and Table 20 show the design data of the inflection point and the stagnation point of each lens in the camera optical lens 50 according to this embodiment of the present invention.

TABLE 19

|  | Number of inflection points | Inflection point position 1 | Inflection point position 2 |
| --- | --- | --- | --- |
| P1R1 | 2 | 0.165 | 1.225 |
| P1R2 | 2 | 0.745 | 0.815 |
| P2R1 | 0 | / | / |
| P2R2 | 1 | 0.705 | / |
| P3R1 | 2 | 0.435 | 0.825 |
| P3R2 | 1 | 0.965 | / |
| P4R1 | 2 | 0.305 | 1.035 |
| P4R2 | 1 | 0.365 | / |

TABLE 20

|  | Number of stagnation points | Stagnation point position 1 | Stagnation point position 2 |
| --- | --- | --- | --- |
| P1R1 | 1 | 0.285 | / |
| P1R2 | 0 | / | / |
| P2R1 | 0 | / | / |
| P2R2 | 0 | / | / |
| P3R1 | 2 | 0.765 | 0.865 |
| P3R2 | 0 | / | / |
| P4R1 | 1 | 0.535 | / |
| P4R2 | 1 | 0.875 | / |

Figure 18:
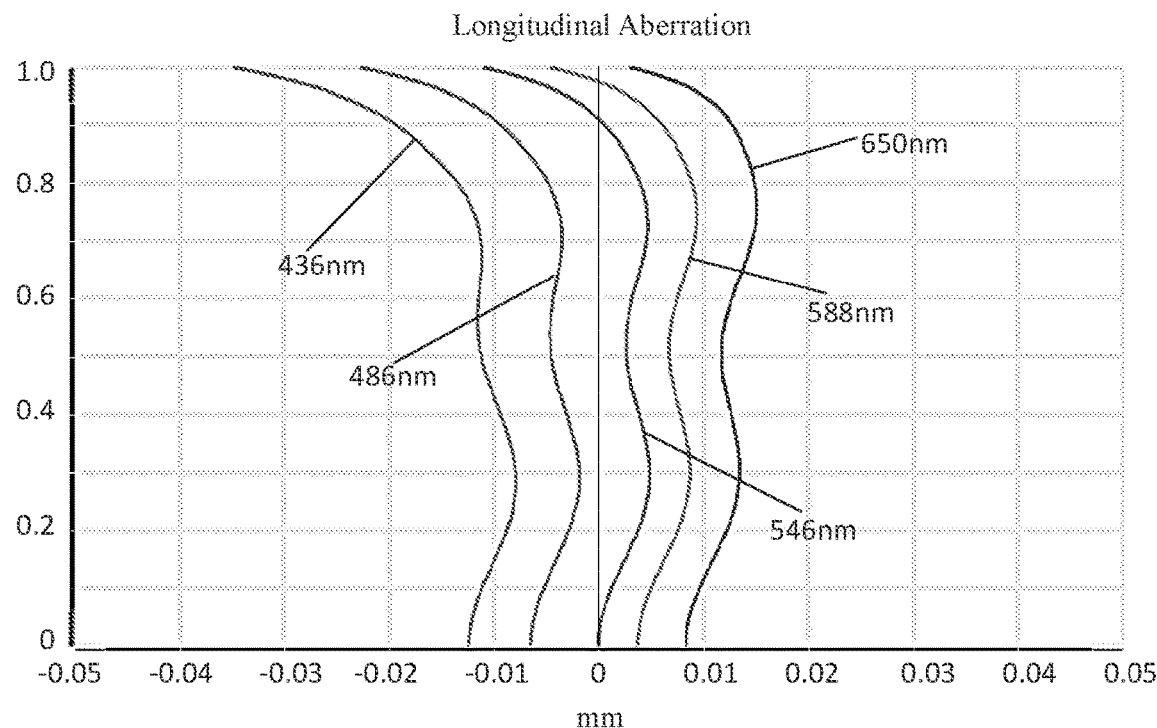
FIG. 18 is a schematic diagram of longitudinal aberration of the camera optical lens shown in FIG. 17.
Figure 19:
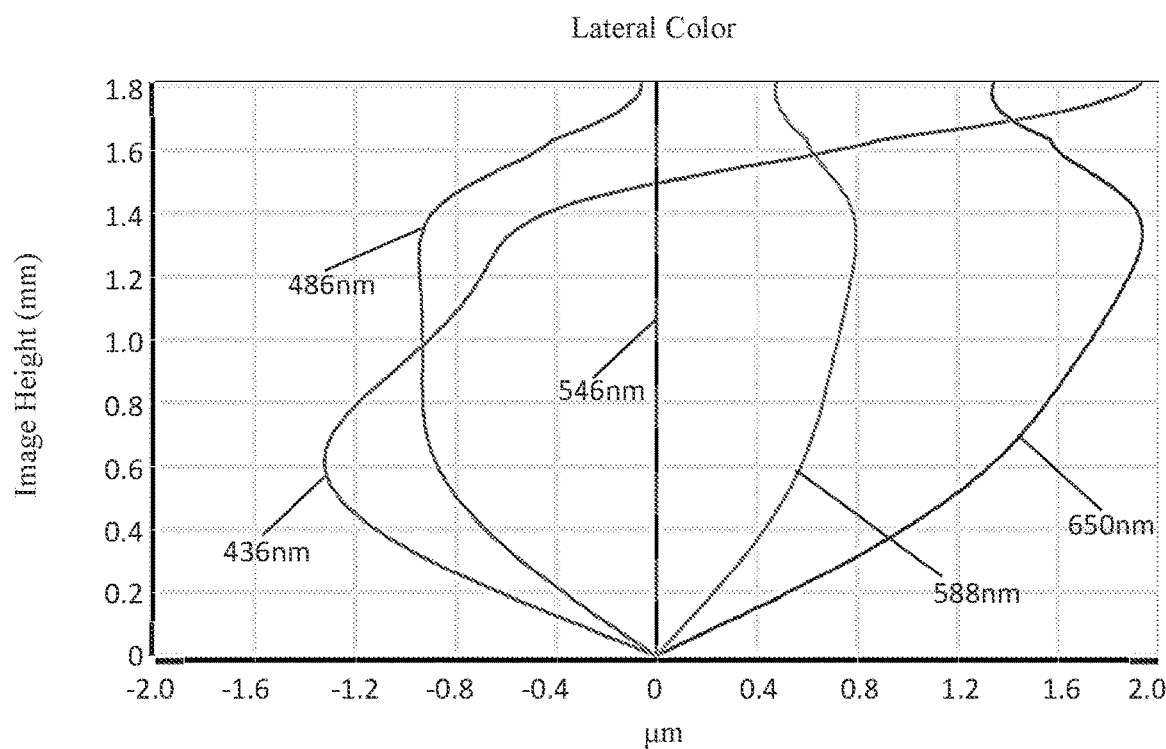
FIG. 19 is a schematic diagram of lateral color of the camera optical lens shown in FIG. 17.
Figure 20:
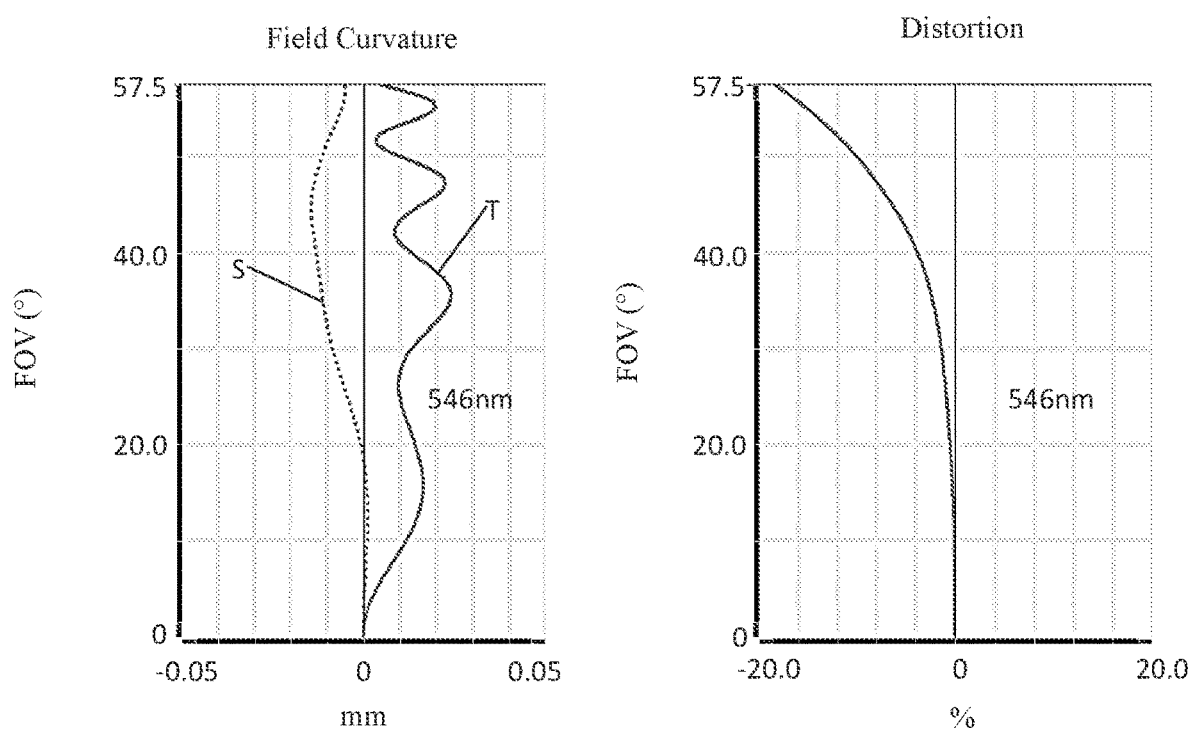
FIG. 20 is a schematic diagram of field curvature and distortion of the camera optical lens shown in FIG. 17.

FIG. 18 and FIG. 19 respectively show schematic diagrams of longitudinal aberration and lateral color of light having wavelengths of 650 nm, 588 nm, 546 nm, 486 nm, and 436 nm after passing through the camera optical lens 50 according to Embodiment 5. FIG. 20 shows a schematic diagram of field curvature and distortion of light having a wavelength of 546 nm after passing through the camera optical lens 50 according to Embodiment 5. In FIG. 20, the field curvature S is the field curvature in a sagittal direction, and the field curvature T is the field curvature in a meridian direction.

In addition, the values corresponding to the various parameters and the parameters specified in the conditions in Embodiment 5 are listed in Table 21.

As shown in Table 21, Embodiment 5 satisfies the respective conditions.

In this embodiment, an entrance pupil diameter ENPD of the camera optical lens 50 is 0.643 mm, the full field of view image height IH is 1.815 mm, and the FOV in a diagonal direction is 115.00°, so that the camera optical lens 50 can meet the design requirements of a large aperture, a wide angle and ultra-thinness. The on-axis and off-axis color aberrations are fully corrected, and the camera optical lens 50 has excellent optical performance.

TABLE 21

| Parameters and conditions | Embodiment 1 | Embodiment 2 | Embodiment 3 | Embodiment 4 | Embodiment 5 |
| --- | --- | --- | --- | --- | --- |
| f1/f | −2.39 | −2.00 | −3.50 | −3.23 | −3.44 |
| f3/f | 0.68 | 0.75 | 0.70 | 0.55 | 0.75 |
| d3/d4 | 13.01 | 14.90 | 5.00 | 10.02 | 6.68 |
| d5/d6 | 29.97 | 34.97 | 5.00 | 30.77 | 29.27 |
| (R3 + R4)/(R3 − R4) | −12.58 | −3.01 | −19.98 | −19.92 | −3.00 |
| R1/R2 | −2.95 | −2.01 | −2.20 | −5.00 | −2.00 |

TABLE 21-continued

| Parameters and conditions | Embodiment 1 | Embodiment 2 | Embodiment 3 | Embodiment 4 | Embodiment 5 |
| --- | --- | --- | --- | --- | --- |
| f | 1.401 | 1.422 | 1.429 | 1.430 | 1.415 |
| f1 | −3.347 | −2.851 | −4.997 | −4.623 | −4.863 |
| f2 | 26.305 | 8.496 | −246.213 | 238.137 | −44.021 |
| f3 | 0.956 | 1.065 | 1.001 | 0.788 | 1.061 |
| f4 | −1.385 | −1.591 | −1.381 | −0.888 | −1.896 |
| f12 | −3.582 | −4.151 | −4.956 | −4.654 | −4.351 |
| FNO | 2.20 | 2.20 | 2.20 | 2.20 | 2.20 |
| TTL | 4.021 | 4.026 | 4.029 | 4.028 | 4.027 |
| IH | 1.815 | 1.815 | 1.815 | 1.815 | 1.815 |
| FOV | 114.80 | 114.80 | 114.80 | 114.80 | 115.00 |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
   a first lens having a negative refractive power;
   a second lens;
   a third lens having a positive refractive power; and
   a fourth lens having a negative refractive power,
   where the camera optical lens satisfies following conditions:

$-3.50 \leq f1/f \leq -2.00$;

$0.55 \leq f3/f \leq 0.75$;

$5.00 \leq d3/d4 \leq 15.00$;

$5.00 \leq d5/d6 \leq 35.00$;

$-20.00 \leq (R3+R4)/(R3-R4) \leq -3.00$; and $-5.00 \leq R1/R2 \leq -2.00$, where f denotes a focal length of the camera optical lens, f1 denotes a focal length of the first lens, f3 denotes a focal length of the third lens, d3 denotes an on-axis thickness of the second lens, d4 denotes an on-axis distance from an image side surface of the second lens to an object side surface of the third lens, d5 denotes an on-axis thickness of the third lens, d6 denotes an on-axis distance from an image side surface of the third lens to an object side surface of the fourth lens, R3 denotes a curvature radius of an object side surface of the second lens, R4 denotes a curvature radius of the image side surface of the second lens, R1 denotes a curvature radius of an object side surface of the first lens, and R2 denotes a curvature radius of an image side surface of the first lens.

2. The camera optical lens as described in claim 1, further satisfying a following condition:

$2.00 \leq R7/R8 \leq 8.00$, where R7 denotes a curvature radius of the object side surface of the fourth lens, and R8 denotes a curvature radius of an image side surface of the fourth lens.

3. The camera optical lens as described in claim 1, further satisfying following conditions:

$0.17 \leq (R1+R2)/(R1-R2) \leq 1.00$; and $0.04 \leq d1/TTL \leq 0.17$, where d1 denotes an on-axis thickness of the first lens, and TTL denotes a total optical length from the object side surface of the first lens to an image plane of the camera optical lens along an optic axis.

4. The camera optical lens as described in claim 1, further satisfying following conditions:

$$-344.59 \leq f2/f \leq 249.79; \text{ and}$$

$$0.06 \leq d3/TTL \leq 0.38,$$

where f2 denotes a focal length of the second lens, and TTL denotes a total optical length from the object side surface of the first lens to an image plane of the camera optical lens along an optic axis.

5. The camera optical lens as described in claim 1, further satisfying following conditions:

$$-0.20 \leq (R5+R6)/(R5-R6) \leq 0.65; \text{ and}$$

$$0.11 \leq d5/TTL \leq 0.39,$$

where R5 denotes a curvature radius of the object side surface of the third lens, R6 denotes a curvature radius of the image side surface of the third lens, and TTL denotes a total optical length from the object side surface of the first lens to an image plane of the camera optical lens along an optic axis.

6. The camera optical lens as described in claim 1, further satisfying following conditions:

$$-2.68 \leq f4/f \leq -0.41;$$

$$0.64 \leq (R7+R8)/(R7-R8) \leq 4.42; \text{ and}$$

$$0.03 \leq d7/TTL \leq 0.13,$$

where f4 denotes a focal length of the fourth lens, R7 denotes a curvature radius of the object side surface of the fourth lens, R8 denotes a curvature radius of an image side surface of the fourth lens, d7 denotes an on-axis thickness of the fourth lens, and TTL denotes a total optical length from the object side surface of the first lens to an image plane of the camera optical lens along an optic axis.

7. The camera optical lens as described in claim 1, further satisfying a following condition:

$$FOV \geq 114.00°,$$

where FOV denotes a field of view of the camera optical lens.

8. The camera optical lens as described in claim 1, further satisfying a following condition:

$$-6.94 \leq f12/f \leq -1.70,$$

where f12 denotes a combined focal length of the first lens and the second lens.

9. The camera optical lens as described in claim 1, further satisfying a following condition:

$$FNO \leq 2.27,$$

where FNO denotes an F number of the camera optical lens.

10. The camera optical lens as described in claim 1, further satisfying a following condition:

$$TTL/IH \leq 3.33,$$

where IH denotes an image height of the camera optical lens, and TTL denotes a total optical length from the object side surface of the first lens to an image plane of the camera optical lens along an optic axis.

* * * * *